United States Patent
Outhred et al.

(10) Patent No.: US 7,684,964 B2
(45) Date of Patent: Mar. 23, 2010

(54) MODEL AND SYSTEM STATE SYNCHRONIZATION

(75) Inventors: Geoffrey Outhred, Seattle, WA (US); Eric K Han, Redmond, WA (US); Kevin D. J. Grealish, Seattle, WA (US); Mathilde C. Brown, Seattle, WA (US); Reid B Gustin, Redmond, WA (US); Rob Mensching, Redmond, WA (US); Steven T Nielsen, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 219 days.

(21) Appl. No.: 11/222,514

(22) Filed: Sep. 8, 2005

(65) Prior Publication Data
US 2006/0034263 A1 Feb. 16, 2006

Related U.S. Application Data

(63) Continuation-in-part of application No. 10/693,004, filed on Oct. 24, 2003.

(60) Provisional application No. 60/452,736, filed on Mar. 6, 2003.

(51) Int. Cl.
G06F 7/60 (2006.01)
G06F 17/10 (2006.01)
G06F 17/50 (2006.01)
G06F 15/173 (2006.01)

(52) U.S. Cl. .............. 703/2; 703/13; 703/22; 709/223

(58) Field of Classification Search .......... 703/2, 703/13, 22; 709/223
See application file for complete search history.

(56) References Cited

U.S. PATENT DOCUMENTS

| 4,200,770 A | 4/1980 | Hellman et al. |
| 4,218,582 A | 8/1980 | Hellman et al. |
| 4,405,829 A | 9/1983 | Rivest et al. |
| 4,424,414 A | 1/1984 | Hellman et al. |
| 5,031,089 A | 7/1991 | Liu et al. |
| 5,220,621 A | 6/1993 | Saitoh |
| 5,430,810 A | 7/1995 | Saeki |
| 5,490,276 A * | 2/1996 | Doli et al. ............ 717/151 |

(Continued)

FOREIGN PATENT DOCUMENTS

CN 1368694 9/2002

(Continued)

OTHER PUBLICATIONS

Chen, et al., "Performance Prediction of Component-based Applications", Journal of Systems and Software, vol. 74, Issue 1, Jan. 2005, pp. 1-12.

(Continued)

*Primary Examiner*—Paul L Rodriguez
*Assistant Examiner*—Dwin M Craig
(74) *Attorney, Agent, or Firm*—Lee & Hayes, PLLC

(57) ABSTRACT

Embodiments of model and system state synchronization are presented herein. An exemplary model of a distributed system includes a plurality of instances where an instance includes an instantiation of a type that includes property values and relationships in the model of the distributed system and includes an associated version history to link each version of an instance to a change request for the distributed system. Other exemplary methods, systems, devices, etc. are also disclosed.

20 Claims, 11 Drawing Sheets

U.S. PATENT DOCUMENTS

| | | | |
|---|---|---|---|
| 5,499,357 A | 3/1996 | Sonty et al. | |
| 5,504,921 A | 4/1996 | Dev et al. | |
| 5,557,774 A | 9/1996 | Shimabukuro et al. | |
| 5,579,482 A * | 11/1996 | Einkauf et al. | 709/220 |
| 5,668,995 A | 9/1997 | Bhat | |
| 5,686,940 A | 11/1997 | Kuga | |
| 5,724,508 A | 3/1998 | Harple, Jr. et al. | |
| 5,748,958 A | 5/1998 | Badovinatz et al. | |
| 5,758,351 A | 5/1998 | Gibson et al. | |
| 5,768,271 A | 6/1998 | Seid et al. | |
| 5,774,689 A | 6/1998 | Curtis et al. | |
| 5,784,463 A | 7/1998 | Chen et al. | |
| 5,790,895 A | 8/1998 | Krontz et al. | |
| 5,818,937 A | 10/1998 | Watson | |
| 5,822,531 A | 10/1998 | Gorczyca et al. | |
| 5,826,015 A | 10/1998 | Schmidt | |
| 5,845,124 A | 12/1998 | Berman | |
| 5,845,277 A | 12/1998 | Pfeil et al. | |
| 5,867,706 A | 2/1999 | Martin et al. | |
| 5,872,928 A | 2/1999 | Lewis et al. | |
| 5,878,220 A | 3/1999 | Olkin et al. | |
| 5,895,499 A | 4/1999 | Chu | |
| 5,905,728 A | 5/1999 | Han et al. | |
| 5,917,730 A * | 6/1999 | Rittie et al. | 703/6 |
| 5,930,798 A | 7/1999 | Lawler et al. | |
| 5,958,009 A | 9/1999 | Friedrich et al. | |
| 5,968,126 A | 10/1999 | Ekstrom et al. | |
| 6,035,405 A | 3/2000 | Gage et al. | |
| 6,041,054 A | 3/2000 | Westberg | |
| 6,047,323 A | 4/2000 | Krause | |
| 6,049,528 A | 4/2000 | Hendel et al. | |
| 6,052,469 A | 4/2000 | Johnson et al. | |
| 6,059,842 A | 5/2000 | Dumarot et al. | |
| 6,065,058 A | 5/2000 | Hailpern et al. | |
| 6,075,776 A | 6/2000 | Tanimoto et al. | |
| 6,076,108 A | 6/2000 | Courts et al. | |
| 6,081,826 A | 6/2000 | Masuoka et al. | |
| 6,085,238 A | 7/2000 | Yuasa et al. | |
| 6,086,618 A | 7/2000 | Al-Hilali et al. | |
| 6,108,702 A | 8/2000 | Wood | |
| 6,112,243 A | 8/2000 | Downs et al. | |
| 6,115,393 A | 9/2000 | Engel et al. | |
| 6,118,785 A | 9/2000 | Araujo et al. | |
| 6,125,442 A | 9/2000 | Maves et al. | |
| 6,125,447 A | 9/2000 | Gong | |
| 6,134,594 A | 10/2000 | Helland et al. | |
| 6,147,995 A | 11/2000 | Dobbins et al. | |
| 6,151,688 A | 11/2000 | Wipfel et al. | |
| 6,167,052 A | 12/2000 | McNeill et al. | |
| 6,167,383 A | 12/2000 | Henson | |
| 6,178,529 B1 | 1/2001 | Short et al. | |
| 6,182,275 B1 | 1/2001 | Beelitz et al. | |
| 6,192,401 B1 | 2/2001 | Modiri et al. | |
| 6,195,091 B1 | 2/2001 | Harple et al. | |
| 6,195,355 B1 | 2/2001 | Demizu | |
| 6,208,345 B1 | 3/2001 | Sheard et al. | |
| 6,208,649 B1 | 3/2001 | Kloth | |
| 6,209,099 B1 | 3/2001 | Saunders | |
| 6,212,559 B1 | 4/2001 | Bixler et al. | |
| 6,226,788 B1 | 5/2001 | Schoening et al. | |
| 6,230,312 B1 | 5/2001 | Hunt | |
| 6,233,610 B1 | 5/2001 | Hayball et al. | |
| 6,236,365 B1 * | 5/2001 | LeBlanc et al. | 342/457 |
| 6,236,901 B1 | 5/2001 | Goss | |
| 6,253,230 B1 | 6/2001 | Couland et al. | |
| 6,256,773 B1 | 7/2001 | Bowman-Amuah | |
| 6,259,448 B1 | 7/2001 | McNally et al. | |
| 6,263,089 B1 | 7/2001 | Otsuka et al. | |
| 6,266,707 B1 | 7/2001 | Boden et al. | |
| 6,269,076 B1 | 7/2001 | Shamir et al. | |
| 6,269,079 B1 | 7/2001 | Marin et al. | |
| 6,304,972 B1 | 10/2001 | Shavit | |
| 6,305,015 B1 | 10/2001 | Akriche et al. | |
| 6,311,144 B1 | 10/2001 | Abu El Ata | |
| 6,311,270 B1 | 10/2001 | Challener et al. | |
| 6,317,438 B1 * | 11/2001 | Trebes, Jr. | 370/466 |
| 6,330,605 B1 | 12/2001 | Christensen et al. | |
| 6,336,138 B1 * | 1/2002 | Caswell et al. | 709/223 |
| 6,338,112 B1 | 1/2002 | Wipfel et al. | |
| 6,351,685 B1 | 2/2002 | Dimitri et al. | |
| 6,353,861 B1 * | 3/2002 | Dolin et al. | 719/318 |
| 6,353,898 B1 | 3/2002 | Wipfel et al. | |
| 6,360,265 B1 | 3/2002 | Falck et al. | |
| 6,367,010 B1 | 4/2002 | Venkatram et al. | |
| 6,370,573 B1 | 4/2002 | Bowman-Amuah | |
| 6,370,584 B1 | 4/2002 | Bestavros et al. | |
| 6,377,996 B1 | 4/2002 | Lumelsky et al. | |
| 6,389,464 B1 | 5/2002 | Krishnamurthy et al. | |
| 6,393,386 B1 | 5/2002 | Zager et al. | |
| 6,393,456 B1 | 5/2002 | Ambler et al. | |
| 6,393,474 B1 | 5/2002 | Eichert et al. | |
| 6,393,485 B1 | 5/2002 | Chao et al. | |
| 6,408,390 B1 | 6/2002 | Saito | |
| 6,424,718 B1 | 7/2002 | Holloway | |
| 6,424,992 B2 | 7/2002 | Devarakonda et al. | |
| 6,427,163 B1 | 7/2002 | Arendt et al. | |
| 6,427,171 B1 | 7/2002 | Craft et al. | |
| 6,438,100 B1 | 8/2002 | Halpern et al. | |
| 6,442,557 B1 | 8/2002 | Buteau et al. | |
| 6,442,713 B1 | 8/2002 | Block et al. | |
| 6,449,650 B1 | 9/2002 | Westfall et al. | |
| 6,457,048 B2 | 9/2002 | Sondur et al. | |
| 6,463,536 B2 | 10/2002 | Saito | |
| 6,466,985 B1 | 10/2002 | Goyal et al. | |
| 6,470,025 B1 | 10/2002 | Wilson et al. | |
| 6,470,464 B2 | 10/2002 | Bertram et al. | |
| 6,473,791 B1 | 10/2002 | Al-Ghosein et al. | |
| 6,480,955 B1 | 11/2002 | DeKoning et al. | |
| 6,484,261 B1 | 11/2002 | Wiegel | |
| 6,502,131 B1 | 12/2002 | Vaid et al. | |
| 6,505,244 B1 | 1/2003 | Natarajan et al. | |
| 6,519,615 B1 | 2/2003 | Wollrath et al. | |
| 6,529,953 B1 | 3/2003 | Van Renesse | |
| 6,539,494 B1 | 3/2003 | Abramson et al. | |
| 6,546,423 B1 | 4/2003 | Dutta et al. | |
| 6,546,553 B1 | 4/2003 | Hunt | |
| 6,549,934 B1 | 4/2003 | Peterson et al. | |
| 6,564,261 B1 | 5/2003 | Gudjonsson et al. | |
| 6,570,847 B1 | 5/2003 | Hosein | |
| 6,570,875 B1 | 5/2003 | Hegde | |
| 6,574,195 B2 | 6/2003 | Roberts | |
| 6,584,499 B1 | 6/2003 | Jantz et al. | |
| 6,587,876 B1 | 7/2003 | Mahon et al. | |
| 6,598,077 B2 | 7/2003 | Primak et al. | |
| 6,598,173 B1 | 7/2003 | Sheikh et al. | |
| 6,598,223 B1 | 7/2003 | Vrhel, Jr. et al. | |
| 6,601,101 B1 | 7/2003 | Lee et al. | |
| 6,601,233 B1 | 7/2003 | Underwood | |
| 6,606,708 B1 | 8/2003 | Devine et al. | |
| 6,609,148 B1 | 8/2003 | Salo et al. | |
| 6,609,213 B1 | 8/2003 | Nguyen et al. | |
| 6,611,522 B1 | 8/2003 | Zheng et al. | |
| 6,628,671 B1 | 9/2003 | Dynarski et al. | |
| 6,631,141 B1 | 10/2003 | Kumar et al. | |
| 6,640,303 B1 | 10/2003 | Vu | |
| 6,651,101 B1 | 11/2003 | Gai et al. | |
| 6,651,240 B1 | 11/2003 | Yamamoto et al. | |
| 6,654,782 B1 | 11/2003 | O'Brien et al. | |
| 6,654,796 B1 | 11/2003 | Slater et al. | |
| 6,671,699 B1 * | 12/2003 | Black et al. | 707/201 |
| 6,675,308 B1 | 1/2004 | Thomsen | |
| 6,678,821 B1 | 1/2004 | Waugh et al. | |
| 6,678,835 B1 | 1/2004 | Shah et al. | |
| 6,681,262 B1 | 1/2004 | Rimmer | |

| | | | | | | |
|---|---|---|---|---|---|---|
| 6,691,148 B1 | 2/2004 | Zinky et al. | | 6,983,317 B1 | 1/2006 | Bishop et al. |
| 6,691,165 B1 | 2/2004 | Bruck et al. | | 6,985,956 B1 | 1/2006 | Luke et al. |
| 6,691,168 B1 | 2/2004 | Bal et al. | | 6,990,666 B2 | 1/2006 | Hirschfeld et al. |
| 6,694,436 B1 | 2/2004 | Audebert | | 7,003,562 B2 | 2/2006 | Mayer |
| 6,701,363 B1 | 3/2004 | Chiu et al. | | 7,003,574 B1 | 2/2006 | Bahl |
| 6,717,949 B1 | 4/2004 | Boden et al. | | 7,012,919 B1 | 3/2006 | So et al. |
| 6,718,361 B1 | 4/2004 | Basani et al. | | 7,013,462 B2 | 3/2006 | Zara et al. |
| 6,718,379 B1 | 4/2004 | Krishna et al. | | 7,016,950 B2 | 3/2006 | Tabbara et al. |
| 6,725,253 B1 | 4/2004 | Okano et al. | | 7,024,451 B2 | 4/2006 | Jorgenson |
| 6,728,885 B1 | 4/2004 | Taylor et al. | | 7,027,412 B2 | 4/2006 | Miyamoto et al. |
| 6,735,596 B2 | 5/2004 | Corynen | | 7,028,228 B1 | 4/2006 | Lovy et al. |
| 6,738,736 B1 | 5/2004 | Bond | | 7,035,786 B1 | 4/2006 | Abu El Ata et al. |
| 6,741,266 B1 | 5/2004 | Kamiwada et al. | | 7,035,930 B2 | 4/2006 | Graupner et al. |
| 6,742,020 B1 | 5/2004 | Dimitroff et al. | | 7,043,407 B2 | 5/2006 | Lynch et al. |
| 6,748,447 B1 | 6/2004 | Basani et al. | | 7,043,545 B2 | 5/2006 | Tabbara et al. |
| 6,754,716 B1 | 6/2004 | Sharma et al. | | 7,046,680 B1 | 5/2006 | McDysan et al. |
| 6,754,816 B1 | 6/2004 | Layton et al. | | 7,050,961 B1 | 5/2006 | Lee et al. |
| 6,757,744 B1 | 6/2004 | Narisi et al. | | 7,054,943 B1 | 5/2006 | Goldszmidt et al. |
| 6,760,765 B1 | 7/2004 | Asai et al. | | 7,058,704 B1 | 6/2006 | Mangipudi et al. |
| 6,760,775 B1 | 7/2004 | Anerousis et al. | | 7,058,826 B2 | 6/2006 | Fung |
| 6,769,008 B1 | 7/2004 | Kumar et al. | | 7,058,858 B2 | 6/2006 | Wong et al. |
| 6,769,060 B1 | 7/2004 | Dent et al. | | 7,062,718 B2 | 6/2006 | Kodosky et al. |
| 6,779,016 B1 | 8/2004 | Aziz et al. | | 7,069,480 B1 | 6/2006 | Lovy et al. |
| 6,782,408 B1 | 8/2004 | Chandra et al. | | 7,069,553 B2 | 6/2006 | Narayanaswamy et al. |
| 6,789,090 B1 | 9/2004 | Miyake et al. | | 7,072,807 B2 | 7/2006 | Brown et al. |
| 6,801,528 B2 | 10/2004 | Nassar | | 7,072,822 B2 | 7/2006 | Humenansky et al. |
| 6,801,937 B1 | 10/2004 | Novaes et al. | | 7,076,633 B2 | 7/2006 | Tormasov et al. |
| 6,801,949 B1 | 10/2004 | Bruck et al. | | 7,080,143 B2 | 7/2006 | Hunt et al. |
| 6,813,778 B1 | 11/2004 | Poli et al. | | 7,082,464 B2 | 7/2006 | Hasan et al. |
| 6,816,897 B2 | 11/2004 | McGuire | | 7,089,281 B1 | 8/2006 | Kazemi et al. |
| 6,820,042 B1 | 11/2004 | Cohen et al. | | 7,089,293 B2 | 8/2006 | Grosner et al. |
| 6,820,121 B1 | 11/2004 | Callis et al. | | 7,089,530 B1 * | 8/2006 | Dardinski et al. ........... 717/105 |
| 6,823,299 B1 | 11/2004 | Contreras et al. | | 7,093,005 B2 | 8/2006 | Patterson |
| 6,823,373 B1 | 11/2004 | Pancha et al. | | 7,093,288 B1 | 8/2006 | Hydrie et al. |
| 6,823,382 B2 | 11/2004 | Stone | | 7,096,258 B2 | 8/2006 | Hunt et al. |
| 6,829,639 B1 | 12/2004 | Lawson et al. | | 7,099,936 B2 | 8/2006 | Chase et al. |
| 6,829,770 B1 | 12/2004 | Hinson et al. | | 7,103,185 B1 | 9/2006 | Srivastava et al. |
| 6,836,750 B2 | 12/2004 | Wong et al. | | 7,103,874 B2 | 9/2006 | McCollum et al. |
| 6,845,160 B1 | 1/2005 | Aoki | | 7,113,900 B1 | 9/2006 | Hunt et al. |
| 6,853,841 B1 | 2/2005 | St. Pierre | | 7,117,158 B2 | 10/2006 | Weldon et al. |
| 6,854,069 B2 | 2/2005 | Kampe et al. | | 7,117,261 B2 | 10/2006 | Kryskow, Jr. et al. |
| 6,856,591 B1 | 2/2005 | Ma et al. | | 7,120,154 B2 | 10/2006 | Bavant et al. |
| 6,862,613 B1 | 3/2005 | Kumar et al. | | 7,124,289 B1 | 10/2006 | Suorsa |
| 6,868,062 B1 | 3/2005 | Yadav et al. | | 7,127,625 B2 | 10/2006 | Farkas et al. |
| 6,868,454 B1 | 3/2005 | Kubota et al. | | 7,131,123 B2 | 10/2006 | Suorsa et al. |
| 6,880,002 B2 | 4/2005 | Hirschfeld et al. | | 7,134,011 B2 | 11/2006 | Fung |
| 6,886,038 B1 | 4/2005 | Tabbara et al. | | 7,134,122 B1 | 11/2006 | Sero et al. |
| 6,888,807 B2 | 5/2005 | Heller et al. | | 7,139,930 B2 | 11/2006 | Mashayekhi et al. |
| 6,895,534 B2 | 5/2005 | Wong et al. | | 7,139,999 B2 | 11/2006 | Bowman-Amuah |
| 6,898,791 B1 | 5/2005 | Chandy et al. | | 7,143,420 B2 | 11/2006 | Radhakrishnan |
| 6,904,458 B1 | 6/2005 | Bishop et al. | | 7,146,353 B2 | 12/2006 | Garg et al. |
| 6,907,395 B1 | 6/2005 | Hunt et al. | | 7,150,015 B2 | 12/2006 | Pace et al. |
| 6,912,568 B1 | 6/2005 | Nishiki et al. | | 7,152,109 B2 | 12/2006 | Suorsa et al. |
| 6,915,338 B1 | 7/2005 | Hunt et al. | | 7,152,157 B2 | 12/2006 | Murphy et al. |
| 6,922,791 B2 | 7/2005 | Mashayekhi et al. | | 7,155,380 B2 | 12/2006 | Hunt et al. |
| 6,928,482 B1 | 8/2005 | Ben Nun et al. | | 7,155,490 B1 | 12/2006 | Malmer et al. |
| 6,944,183 B1 | 9/2005 | Iyer et al. | | 7,162,427 B1 | 1/2007 | Myrick et al. |
| 6,944,759 B1 | 9/2005 | Crisan | | 7,162,509 B2 | 1/2007 | Brown et al. |
| 6,947,987 B2 | 9/2005 | Boland | | 7,174,379 B2 | 2/2007 | Agarwal et al. |
| 6,954,930 B2 | 10/2005 | Drake et al. | | 7,181,731 B2 | 2/2007 | Pace et al. |
| 6,957,186 B1 | 10/2005 | Guheen et al. | | 7,188,335 B1 | 3/2007 | Darr et al. |
| 6,963,981 B1 | 11/2005 | Bailey et al. | | 7,191,344 B2 | 3/2007 | Lin et al. |
| 6,968,291 B1 | 11/2005 | Desai | | 7,191,429 B2 | 3/2007 | Brassard et al. |
| 6,968,535 B2 | 11/2005 | Stelting et al. | | 7,194,439 B2 | 3/2007 | Kassan et al. |
| 6,968,550 B2 | 11/2005 | Branson et al. | | 7,194,616 B2 | 3/2007 | Axnix et al. |
| 6,968,551 B2 | 11/2005 | Hediger et al. | | 7,197,418 B2 | 3/2007 | Fuller, III et al. |
| 6,971,063 B1 | 11/2005 | Rappaport et al. | | 7,200,530 B2 | 4/2007 | Brown et al. |
| 6,971,072 B1 | 11/2005 | Stein | | 7,200,655 B2 | 4/2007 | Hunt et al. |
| 6,973,620 B2 | 12/2005 | Gusler et al. | | 7,203,911 B2 | 4/2007 | Williams |
| 6,973,622 B1 | 12/2005 | Rappaport et al. | | 7,213,231 B1 | 5/2007 | Bandhole et al. |
| 6,976,079 B1 | 12/2005 | Ferguson et al. | | 7,222,147 B1 | 5/2007 | Black et al. |
| 6,976,269 B1 | 12/2005 | Avery, IV et al. | | 7,225,441 B2 | 5/2007 | Kozuch et al. |
| 6,978,379 B1 | 12/2005 | Goh et al. | | 7,231,410 B1 | 6/2007 | Walsh et al. |

| | | |
|---|---|---|
| 7,254,634 B1 | 8/2007 | Davis et al. |
| 7,257,584 B2 | 8/2007 | Hirschfeld et al. |
| 7,275,156 B2 | 9/2007 | Balfanz et al. |
| 7,278,273 B1 | 10/2007 | Whitted et al. |
| 7,281,154 B2 | 10/2007 | Mashayekhi et al. |
| 7,302,608 B1 | 11/2007 | Acharya et al. |
| 7,305,549 B2 | 12/2007 | Hunt et al. |
| 7,305,561 B2 | 12/2007 | Hunt et al. |
| 7,313,573 B2 | 12/2007 | Leung et al. |
| 7,315,801 B1 | 1/2008 | Dowd et al. |
| 7,333,000 B2 | 2/2008 | Vassallo |
| 7,349,891 B2 | 3/2008 | Charron et al. |
| 7,350,068 B2 | 3/2008 | Anderson et al. |
| 7,350,186 B2 | 3/2008 | Coleman et al. |
| 7,366,755 B1 | 4/2008 | Cuomo et al. |
| 7,367,028 B2 | 4/2008 | Kodosky et al. |
| 7,370,103 B2 | 5/2008 | Hunt et al. |
| 7,376,125 B1 | 5/2008 | Hussain et al. |
| 7,379,982 B2 | 5/2008 | Tabbara |
| 7,386,721 B1 | 6/2008 | Vilhuber et al. |
| 7,395,320 B2 | 7/2008 | Hunt et al. |
| 7,403,901 B1 | 7/2008 | Carley et al. |
| 7,404,175 B2 | 7/2008 | Lee et al. |
| 7,406,517 B2 | 7/2008 | Hunt et al. |
| 7,406,692 B2 | 7/2008 | Halpern et al. |
| 7,409,420 B2 | 8/2008 | Pullara et al. |
| 7,461,249 B1 | 12/2008 | Pearson et al. |
| 7,464,147 B1 | 12/2008 | Fakhouri et al. |
| 2001/0014158 A1 | 8/2001 | Baltzley |
| 2001/0016909 A1 | 8/2001 | Gehrmann |
| 2001/0020228 A1 | 9/2001 | Cantu et al. |
| 2001/0039586 A1 | 11/2001 | Primak et al. |
| 2001/0047400 A1 | 11/2001 | Coates et al. |
| 2001/0051937 A1 | 12/2001 | Ross et al. |
| 2002/0009079 A1 | 1/2002 | Jungck et al. |
| 2002/0010771 A1 | 1/2002 | Mandato |
| 2002/0022952 A1 | 2/2002 | Zager et al. |
| 2002/0040402 A1 | 4/2002 | Levy-Abegnoli et al. |
| 2002/0049573 A1 | 4/2002 | El Ata |
| 2002/0057684 A1 | 5/2002 | Miyamoto et al. |
| 2002/0069267 A1 | 6/2002 | Thiele |
| 2002/0069369 A1 | 6/2002 | Tremain |
| 2002/0075844 A1 | 6/2002 | Hagen |
| 2002/0082820 A1 | 6/2002 | Ferguson et al. |
| 2002/0087264 A1 | 7/2002 | Hills et al. |
| 2002/0090089 A1 | 7/2002 | Branigan et al. |
| 2002/0120761 A1 | 8/2002 | Berg |
| 2002/0131601 A1 | 9/2002 | Ninomiya et al. |
| 2002/0138551 A1 | 9/2002 | Erickson |
| 2002/0152086 A1 | 10/2002 | Smith et al. |
| 2002/0156900 A1 | 10/2002 | Marquette et al. |
| 2002/0161839 A1 | 10/2002 | Colasurdo et al. |
| 2002/0171690 A1 | 11/2002 | Fox et al. |
| 2002/0194342 A1 | 12/2002 | Lu et al. |
| 2002/0194345 A1 | 12/2002 | Lu et al. |
| 2002/0194369 A1 | 12/2002 | Rawlins et al. |
| 2002/0198995 A1 | 12/2002 | Liu et al. |
| 2003/0008712 A1 | 1/2003 | Poulin |
| 2003/0009559 A1 | 1/2003 | Ikeda |
| 2003/0014644 A1 | 1/2003 | Burns et al. |
| 2003/0028642 A1 | 2/2003 | Agarwal et al. |
| 2003/0028770 A1 | 2/2003 | Litwin, Jr. et al. |
| 2003/0041142 A1 | 2/2003 | Zhang et al. |
| 2003/0041159 A1 | 2/2003 | Tinsley et al. |
| 2003/0046615 A1 | 3/2003 | Stone |
| 2003/0051049 A1 | 3/2003 | Noy et al. |
| 2003/0056063 A1 | 3/2003 | Hochmuth et al. |
| 2003/0065743 A1 | 4/2003 | Jenny et al. |
| 2003/0069369 A1 | 4/2003 | Belenkaya et al. |
| 2003/0074395 A1 | 4/2003 | Eshghi et al. |
| 2003/0101284 A1 | 5/2003 | Cabrera et al. |
| 2003/0105963 A1 | 6/2003 | Slick et al. |
| 2003/0120763 A1 | 6/2003 | Voilpano |
| 2003/0126464 A1 | 7/2003 | McDaniel et al. |
| 2003/0130833 A1 | 7/2003 | Brownell et al. |
| 2003/0138105 A1 | 7/2003 | Challener et al. |
| 2003/0165140 A1 | 9/2003 | Tang et al. |
| 2003/0204734 A1 | 10/2003 | Wheeler |
| 2003/0214908 A1 | 11/2003 | Kumar et al. |
| 2003/0217263 A1 | 11/2003 | Sakai |
| 2003/0225563 A1 | 12/2003 | Gonos |
| 2004/0002878 A1 | 1/2004 | Maria Hinton |
| 2004/0049365 A1 | 3/2004 | Keller et al. |
| 2004/0049509 A1 | 3/2004 | Keller et al. |
| 2004/0068631 A1 | 4/2004 | Ukeda et al. |
| 2004/0073443 A1 | 4/2004 | Gabrick et al. |
| 2004/0073795 A1 | 4/2004 | Jablon |
| 2004/0078787 A1 | 4/2004 | Borek et al. |
| 2004/0111315 A1 | 6/2004 | Sharma et al. |
| 2004/0117438 A1 | 6/2004 | Considine et al. |
| 2004/0117476 A1 | 6/2004 | Steele et al. |
| 2004/0160386 A1 | 8/2004 | Michelitsch et al. |
| 2004/0161111 A1 | 8/2004 | Sherman |
| 2004/0193388 A1 | 9/2004 | Outhred et al. |
| 2004/0199572 A1 | 10/2004 | Hunt et al. |
| 2004/0205179 A1 | 10/2004 | Hunt et al. |
| 2004/0208292 A1 | 10/2004 | Winterbottom |
| 2004/0226010 A1 | 11/2004 | Suorsa |
| 2004/0261079 A1 | 12/2004 | Sen |
| 2004/0264481 A1 | 12/2004 | Darling et al. |
| 2004/0267920 A1 | 12/2004 | Hydrie et al. |
| 2004/0268357 A1 | 12/2004 | Joy et al. |
| 2004/0268358 A1 | 12/2004 | Darling et al. |
| 2005/0008001 A1 | 1/2005 | Williams et al. |
| 2005/0021742 A1 | 1/2005 | Yemini et al. |
| 2005/0055435 A1 | 3/2005 | Gbadegesin et al. |
| 2005/0080811 A1 | 4/2005 | Speeter et al. |
| 2005/0086502 A1 | 4/2005 | Rayes et al. |
| 2005/0091078 A1 | 4/2005 | Hunt et al. |
| 2005/0091227 A1 | 4/2005 | McCollum et al. |
| 2005/0097097 A1 | 5/2005 | Hunt et al. |
| 2005/0097146 A1 | 5/2005 | Konstantinou et al. |
| 2005/0102388 A1 | 5/2005 | Tabbara et al. |
| 2005/0125212 A1 | 6/2005 | Hunt et al. |
| 2005/0138416 A1 | 6/2005 | Qian et al. |
| 2005/0152270 A1 | 7/2005 | Gomez Paredes et al. |
| 2005/0192971 A1 | 9/2005 | Tabbara et al. |
| 2005/0193103 A1 | 9/2005 | Drabik |
| 2005/0246529 A1 | 11/2005 | Hunt et al. |
| 2005/0246771 A1 | 11/2005 | Hunt et al. |
| 2005/0251783 A1 | 11/2005 | Torone et al. |
| 2005/0257244 A1 | 11/2005 | Joly et al. |
| 2005/0268325 A1 | 12/2005 | Kuno et al. |
| 2006/0025984 A1 | 2/2006 | Papaefstathiou et al. |
| 2006/0025985 A1 | 2/2006 | Vinberg et al. |
| 2006/0031248 A1 | 2/2006 | Vinberg et al. |
| 2006/0034263 A1 | 2/2006 | Outhred et al. |
| 2006/0037002 A1 | 2/2006 | Vinberg et al. |
| 2006/0048017 A1 | 3/2006 | Anerousis et al. |
| 2006/0123040 A1 | 6/2006 | McCarthy et al. |
| 2006/0149838 A1 | 7/2006 | Hunt et al. |
| 2006/0155708 A1 | 7/2006 | Brown et al. |
| 2006/0161879 A1 | 7/2006 | Lubrecht et al. |
| 2006/0161884 A1 | 7/2006 | Lubrecht et al. |
| 2006/0232927 A1 | 10/2006 | Vinberg et al. |
| 2006/0235664 A1 | 10/2006 | Vinberg et al. |
| 2006/0259609 A1 | 11/2006 | Hunt et al. |
| 2006/0259610 A1 | 11/2006 | Hunt et al. |
| 2006/0271341 A1 | 11/2006 | Brown et al. |
| 2007/0006177 A1 | 1/2007 | Aiber et al. |
| 2007/0112847 A1 | 5/2007 | Dublish et al. |

| | | |
|---|---|---|
| 2007/0192769 A1 | 8/2007 | Mimura et al. |
| 2008/0059214 A1 | 3/2008 | Vinberg et al. |

FOREIGN PATENT DOCUMENTS

| | | |
|---|---|---|
| CN | 1375685 | 10/2002 |
| EP | 1180886 A1 | 2/2002 |
| EP | 1307018 A1 | 5/2003 |
| JP | 8297567 | 11/1996 |
| JP | 11007407 | 12/1999 |
| JP | 11340980 A | 12/1999 |
| JP | 2000293497 A | 10/2000 |
| JP | 2001339437 A | 12/2001 |
| JP | 2001526814 | 12/2001 |
| JP | 2002084302 | 3/2002 |
| JP | 2002354006 A | 12/2002 |
| JP | 2003532784 | 11/2003 |
| JP | 2005155729 | 6/2005 |
| KR | 10-2002-0026751 | 4/2002 |
| KR | 10-2004-0008275 | 1/2004 |
| RU | 2111625 C1 | 5/1998 |
| RU | 2189072 C2 | 9/2002 |
| WO | WO9853410 | 11/1998 |
| WO | WO9930514 A2 | 6/1999 |
| WO | WO9963439 | 12/1999 |
| WO | WO0022526 | 4/2000 |
| WO | WO0031945 | 6/2000 |
| WO | WO0073929 | 12/2000 |
| WO | WO0230044 A2 | 4/2002 |
| WO | WO0237748 | 5/2002 |
| WO | WO02085051 | 10/2002 |
| WO | WO03027876 A1 | 4/2003 |
| WO | WO03039104 | 5/2003 |

OTHER PUBLICATIONS

Dekhil, et al., "Generalized Policy Model for Application and Service Management", Hewlett-Packard Laboratories, Software Technology Lab, 1999, pp. 1-3.

Garschhammer, et al., "Towards generic Service Management Concepts A Service Model Based Approach", 2001, 14 pages.

Harbour, et al., "MAST An Open Environment for Modeling, Analysis, and Design of Real-Time Systems", 2001, 14 pages.

Hardwick, et al., "Modeling the Performance of E-Commerce Site", Journal of Computer Resource Management, 2002, pp. 1-11.

"Integrated Security Management", OpenPMF (Policy Management Framework), retrieved as early as Apr. 23, 2007 from http://www.objectsecurity.com/doc/openpmf-A4.pdf, 2 pages.

Kounev, "A Capacity Planning Methodology for Distributed E-Commerce Applications", Jan. 2, 2001, pp. 1-13.

Mahon, "OpenView PolicyXpert: Heterogeneous Configuration and Control", OpenView Policy-Based Network Management, Feb. 1999, 4 pages.

Norton, "Simalytic Hybrid Modeling Planning the Capacity of Client/Server Applications", Colorado Technical University, 1997, pp. 1-7.

Selic, "A Generic Framework for Modeling Resources with UML", IEEE, Jun. 2000, pp. 64-69.

Vadim, "On Virtual Data Centers and Their Operating Environments", at <<http://www.hpl.hp.com/techreports/2001/HPL-2001-44.html>>, Mar. 8, 2001, pp. 1-20.

Yuhui, e-Commerce Based on ERP for Enterprize by Utilizing DNA and XML, Computer Engineering, vol. 27, No. 6, p. 165, 166, 182, Jun. 2001.

Araki, "Linux Security Diary, Use VLAN in Linux", Linux Japan, Itsutsubashi Research Co.,ltd., vol. 3, No. 11, Nov. 1, 2008, pp. 110-113 (CSDB: National Academy Paper 200300158009.

"C.O.B.A.S Centralized Out-Of-Band Authentication System", QT Worldtel Inc., Sep. 8-9, 2003, pp. 14.

"Enhanced IP Services for Cisco Networks", retrieved on Jun. 19, 2007, at <<http://proquest.safaribooksonline.com/1578701066>>, Sep. 23, 1999, pp. 11.

Frolund, et al., "Design-Time Simulation of a Large-Scale, Distributed object System" ACM 1998, pp. 374-400.

Howard et al., "Designing Secure Web-Based Applications for Microsoft Windows 2000", 2000.

Levillain, et al., "Switch-Based Server Load Balancing for Enterprises," Alcatel Telecommunications Review; No. 4 pp. 298-302; 2002.

Liu et al., "Visualization in Network Topology Optimization", ACM, 1992, pp. 131-138.

Miyamoto, et al., "VLAN Management System on Large-scale Network," Journal of Information Processing Society of Japan, vol. 41, No. 12, pp. 3234-3244, the Information Processing Society of Japan, Dec. 15, 2000. (CSDB: National Academy Paper 200200108005).

Nerurkar, "Security Analysis and Design", Dr. Dobb's Journal, Nov. 2000, pp. 50-56.

Nestor, "Security Modeling Using Hierarchical State Machines", IEEE 1991, pp. 110-119.

"Pretty Good Privacy PGP for Personal Privacy, Version 5.0 For Windows 95 Windows NT", Pretty Good Privacy Inc., 1997, pp. 137.

Shi et al., "An Effective Model for Composition of Secure Systems", The Journal of Systems and Software, 1998, pp. 233-244.

Somers, "Hybrid: Unifying Centralised and Distributed Network Management using Intelligent Agents" IEEE Network Operations and Management Symposium Kyoto Apr. 15-19, 1996. pp. 34-43.

Sultan, et al., "Migratory TCP: Connection Migration for Service Continuity," in the Internet Proceedings 22nd Intl. Conference on Distributed Computing Systems; Jul. 2002; pp. 469-740.

Wen-Chen Wang, "How a SCVP client authenticates the SCVP server", Online! Sep. 12, 2003, Retrieved from the Internet: URL:http://www.imc.org/ietf-pkix/old-archive-03/msg01323.html, p. 1.

Chunxiao, et al, "Using XML Schema to Configure Mobile E-Commerce Transaction Model", Applications of the Computer Systems, No. 2, Feb. 28, 2008, 9 pages.

Lee, et al., "Community Services: A Toolkit for Rapid Deployment of Network Services", Proceedings of the IEEE International Conference on Cluster Computing, Cluster 2002, IEEE, 2002, 4 pages.

Meli, "Measuring Change Requests to support effective project management practices", Proc of the ESCOM 2001, London, Apr. 2001, pp. 25-34.

Microsoft.com, "System Definition Model", retrived at <<http://web.archive.org/web/20040405230803/www.microsoft.com/windowsserversystem/dsi/sdm.mspx>>, Mar. 31, 2004.

PCT Intl Search Report and Written Opinion for Application No. PCT/US2006/038856, dated Feb. 20, 2007, 9 pgs.

Cardelli, L., "Type Systems," CRC Handbook of Computer Science and Engineering, 2nd Edition, Ch. 97, Wednesday, Feb. 25, 2004, 8:00pm CRC Press., http://research.microsoft.com/Users/luca/Papers/TypeSystems.pdf.

"Core Principles of the Dynamic Systems Initiative: Leveraging System Knowledge, Captured in Software Models, to Address Challenges Across the IT Life Cycle," Windows Server System, http://www.microsoft.com/windowsserversystem/dsi/dsicore.mspx Nov. 15, 2004.

Menezes, et al., "Handbook of Applied Cryptography", CRC Press, 1996, Chapters 8 & 12, pp. 283-319 and 489-541.

Iwasaki, Hideki "IP Troubles Q & A—The Prevention of Network Troubles and the Risk Management", Computer & Network LAN, Japan Ohmsha, Ltd., vol. 18, No. 8, (Jul. 14, 2000), pp. 29-39.

Translated copy of the Japanese Office Action mailed on Jan. 26, 2007 for Japanese Patent Application No. 2001-326848, a counterpart foreign application of US Patent No. 6,886,038.

Translated copy of the Japanese Office Action mailed on Dec. 14, 2007 for Japanese Patent Application No. 2001-326848, a counterpart foreign application of US Patent No. 6,886,038.

Kitjongthawonkul, S., et al., "Modeling Information Systems Using Objects, Agents, and Task-Based Problem Solving Adapters," Proc. 10th Australasian Conference on Information Systems, 1999, http://www.vuw.ac.nz/acis99/Papers/PaperKitjongthawonkul-077.pdf.

Meader, P., "Build Distributed Apps a New Way," VSLive!ShowDaily, San Francisco, Mar. 25, 2004, http://www.ftponline.com/reports/vslivesf/2004/whitehorse2/.

Meader, P., "Model Apps More Effectively," VSLive!ShowDaily, San Francisco, Mar. 24, 2004, http://www.ftponline.com/reports/vslivesf/2004/whitehorse/.

"System Definition Model," Windows Server System Home, http://www.microsoft.com/windowsserversystem/dsi/sdm.mspx, Dec. 15, 2003.

"The Age Changed by Information Network and System: The Internet Releasing Enterprises and Society A? The New Century created by an E Service and a Terabit Network Service: Disappearance of Enterprise Servers, Service Components behind the Internet", Nikkei Internet Technology, Japan, Nikkei BUsiness Publications, Inc. No. 30, (Dec. 22, 1999), pp. 76-81.

Tofts, C., "HOLOS—A Simulation and Multi Mathematical Modelling Tool," Hewlett-Packard Company, 2001, http://www.hpl.hp.com/techreports/2001/HPL-2001-276.pdf.

Iyer, et al., "ClassiPI: An Archetecture for Fast and Flexible Packet Classification," IEEE Network, Mar./Apr. 2001, vol. 15 No. 2.

Heinl, et al., "A Comprehensive Approach to Flexibility in Workflow Management Systems", WACC 1999, ACM, 1999, pp. 79-88.

"Remote Operating System Installation", retrieved on Feb. 13, 2009 at <<http://technet.microsoft.com/en-us/library/bb742501.aspx>>, Microsoft TechNet, Sep. 9, 1999, pp. 1-28.

* cited by examiner

MODEL AND SYSTEM STATE SYNCHRONIZATION

RELATED APPLICATIONS

This application claims priority under 35 U.S.C. § 120 as a continuation-in-part of U.S. patent application Ser. No. 10/693,004, filed Oct. 24, 2003 and titled "ARCHITECTURE FOR DISTRIBUTED COMPUTING SYSTEM AND AUTOMATED DESIGN, DEPLOYMENT, AND MANAGEMENT OF DISTRIBUTED APPLICATIONS", which claims the benefit of U.S. Provisional Application No. 60/452,736, filed Mar. 6, 2003, and titled "ARCHITECTURE FOR DISTRIBUTED COMPUTING SYSTEM AND AUTOMATED DESIGN, DEPLOYMENT, AND MANAGEMENT OF DISTRIBUTED APPLICATIONS", both of which are hereby incorporated by reference in their entirety.

BACKGROUND

Internet usage has exploded over the past several years and continues to grow. People have become very comfortable with many services offered on the World Wide Web (or simply "Web"), such as electronic mail, online shopping, gathering news and information, listening to music, viewing video clips, looking for jobs, and so forth. To keep pace with the growing demand for Internet-based services, there has been tremendous growth in the computer systems dedicated to hosting Websites, providing backend services for those sites, and storing data associated with the sites.

One type of distributed computer system is a data center (such as an Internet data center (IDC) or an Enterprise Data Center (EDC)), which is a specifically designed complex that houses many computers for hosting network-based services. Data centers, which may also go by the names of "Webfarms" or "server farms", typically house hundreds to thousands of computers in climate-controlled, physically secure buildings. Data centers typically provide reliable Internet access, reliable power supplies, and a secure operating environment.

Today, large data centers are complex and often called upon to host multiple applications. For instance, some websites may operate several thousand computers, and host many distributed applications. These distributed applications often have complex networking requirements that require operators to physically connect computers to certain network switches, as well as manually arrange the wiring configurations within the data center to support the complex applications. As a result, this task of building physical network topologies to conform to the application requirements can be a cumbersome, time consuming process that is prone to human error.

SUMMARY

Model and system state synchronization is described. In an implementation, a discovery technique is described in which a change to a system is discovered and utilized to update a model of the system. In another implementation, a configuration technique is described in which a change to a model is propagated to a system being modeled. This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same numbers are used throughout the following drawings to reference like features.

DETAILED DESCRIPTION

The following disclosure describes a number of aspects pertaining to an architecture for designing and implementing a distributed computing system with large-scale application services. The disclosure includes discussion of a system definition model (SDM), which is also referred to as a service definition model, and an SDM runtime environment. The disclosure further includes design aspects such as how to model various data center components.

As used herein, the term "wire" may also be referred to as "connections", "communication", or "communication relationship". Also, the term "system" may be referred to as "module" and the term "resource space" may be referred to as "resources". Additionally, the term "application space" may also be referred to as "applications", and the term "instance space" may also be referred to as "instances". Further, the term "class" may also be referred to as "abstract definition", the term "port" may also be referred to as "endpoint", and the term "type" may also be referred to as "definition".

Figure 1:
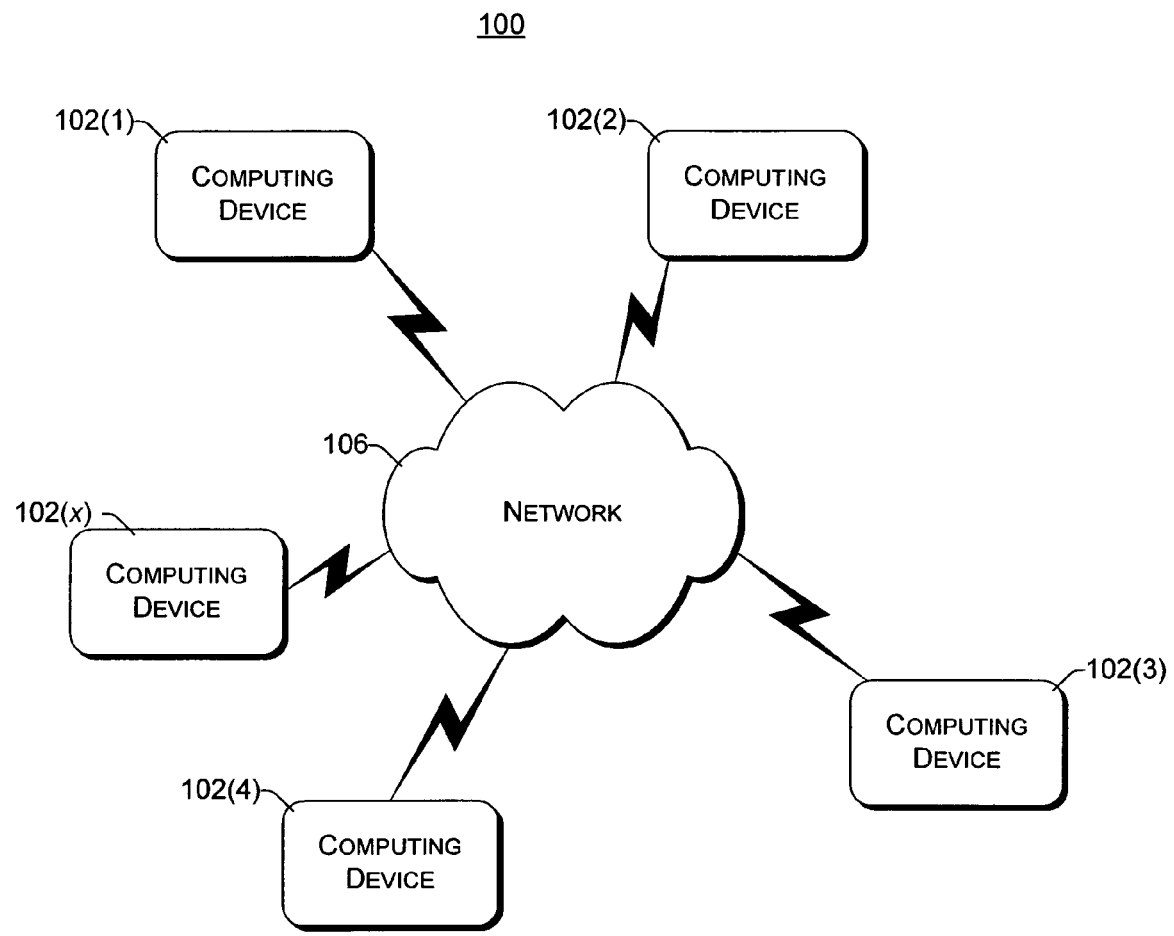
FIG. 1 illustrates an example network setting.

FIG. 1 illustrates an example network setting 100. In setting 100, multiple (x) computing devices 102(1), 102(2), . . . , 102(x) are coupled to a network 106. Network 106 is intended to represent any of a variety of conventional network topologies and types (including wire and/or wireless networks), employing any of a variety of conventional network protocols (including public and/or proprietary protocols). Network 106 may include, for example, a local area network (LAN), a wide area network (WAN), portions of the Internet, and so forth. Setting 100 represents any of a wide variety of settings, including, for example, data centers (e.g., Internet data centers (IDCs)), office or business settings, home settings, educational or research facilities, retail or sales settings, data storage settings, and so forth.

Computing devices 102 can be any of a variety of conventional computing devices, including desktop PCs, workstations, mainframe computers, server computers, Internet appliances, gaming consoles, handheld computers, cellular telephones, personal digital assistants (PDAs), etc. One or more of devices 102 can be the same types of devices, or alternatively different types of devices. Additionally, even if multiple devices are the same types of devices, the multiple devices may still be configured differently (e.g., two devices 102 may be server computers, but may have different hardware configurations, such as different processors, different amounts of RAM, different sizes of hard disk drives, and so forth).

One or more computing devices 102 may also be re-configured after being added to setting 100. For example, a particular computing device 102 may operate for a period of time (e.g., on the order of minutes, hours, days, months, etc.) performing one function, and then an administrator may decide that a different function is desirable (e.g., change from being a server computer to a workstation computer, from a web server to a local file server, etc.).

Figure 2:
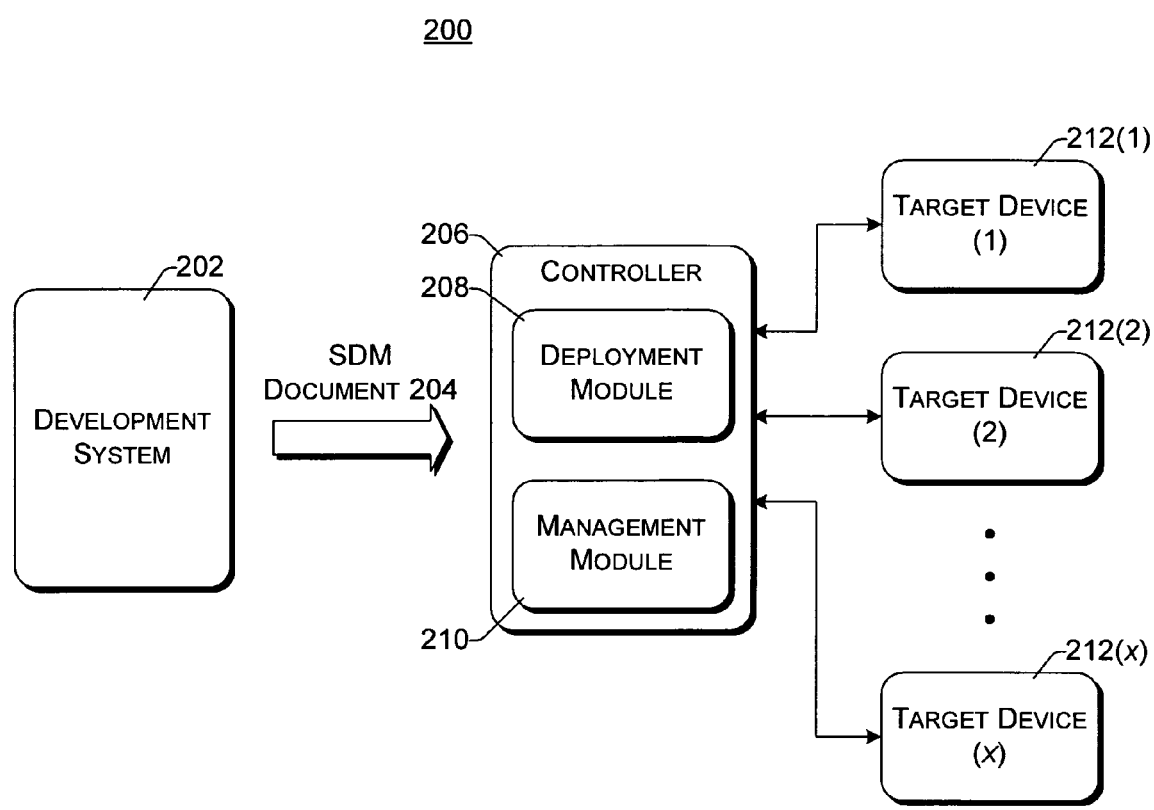
FIG. 2 is a block diagram illustrating an example architecture using a system definition model (SDM).

FIG. 2 is a block diagram illustrating an example architecture 200 using the system definition model. The SDM is designed to be used across the entire lifecycle of a system. A system is a set of related software and/or hardware resources that can work together to accomplish a common function. One example of such a system is an application, which refers to a set of instructions that can be run or executed by a computing device to perform various functionality. Examples of applications include entertainment applications such as games, productivity applications such as word processors, reference applications such as electronic encyclopedias, distributed applications such as may be used for web services or financial analysis, and so forth. Another example of such a system is an environment on which an application (or another environment) can be deployed. An environment refers to the software and/or hardware resources on which an application (or another environment) is deployed. Such environments can be layered, as discussed in more detail below.

The lifecycle of a system typically includes three primary phases (also referred to as stages): a design or development phase, followed by a deployment or installation phase, followed by an operations or management phase. As the model applies to all three phases of the lifecycle of a system, the model can thus be seen as an integration point for the various phases in the lifecycle of a system, and facilitates each of these phases. Additionally, by using the model knowledge can be transferred between these phases, such as knowledge regarding management of the system (e.g., being fed back to the design and development team (e.g., thereby allowing the design and development team to modify the system, such as for future versions or to improve the performance of the current version); knowledge of the structure, deployment requirements and operational behavior of the system; knowledge of the operational environment from the desktop to the data center; knowledge of the service level as observed by the end user; and so forth.

Generally, during the design phase, development tools leveraging the SDM are used to define a system comprised of communicating software and hardware components. A system definition contains all information necessary to deploy and operate a distributed system, including required resources, configuration, operational features, policies, etc. During the deployment phase, the system definition is used to automatically deploy the system and dynamically allocate and configure the software and hardware (e.g., server, storage and networking) resources required. The same system definition can be used for deployments to different host environments and to different scales. During the management phase, an SDM Service in the operating system provides a system-level view for managing the system. This enables new management tools to drive resource allocation, configuration management, upgrades, and process automation from the perspective of a system.

The architecture 200 employs the SDM definition model as well as a schema that defines functional operations within the SDM definition model. The definition model includes various different kinds of data structures which are collectively referred to as "definitions". Functionality of the SDM is exposed through one or more platform services, such as application program interfaces (APIs).

During the design phase for a system, a development system 202 generates a document that contains the system definition, such as an SDM document 204. Development system 202 can be any of a variety of development systems, such as the Visual Studio® development system available from Microsoft® Corporation of Redmond, Wash. SDM document 204 defines all information (also referred to herein as knowledge) related to the deployment and management of the system. Any knowledge necessary for or used when deploying the system or managing the system is included in SDM document 204. Although described herein as a single document, it is to be appreciated that the knowledge could alternatively be spread out and maintained in multiple documents.

SDM document 204 includes one or more constraints (also referred to as requirements) of the system that an environment in which the system is to be deployed and/or run must satisfy. The environment itself is also described using an SDM document. Such environments can be single computing devices, or alternatively collections of computing devices (e.g., data centers), application hosts, etc. Different systems can be installed to different environments. For example, a data center may include fifty computing devices, and one system may be deployed to five of those computing devices, while another system may be deployed to thirty five of those computing devices. These requirements can take a variety of forms, such as: hardware requirements regarding the computing device(s) on which the system is to be deployed (e.g., a minimum processor speed, a minimum amount of memory, a minimum amount of free hard drive space, a minimum amount of network bandwidth available, particular security mechanisms available, and so forth), software requirements regarding the computing device(s) on which the system is to be deployed (e.g., a particular operating system, one or more other applications that also must be installed, specifications regarding how a particular system and/or the operating system is to be configured, a particular type of security or encryption in use, and so forth), other requirements regarding the computing device(s) on which the system is to be deployed (e.g., particular security keys available, data center policies that must be enforced, authentication that is used, environment topology, etc.).

Requirements can also go in the other direction—that is, the environment can have constraints or requirements on the configuration of the system that is to be installed (e.g., to implement the standards or policies of the environment). These can be "explicit" requirements that are created by the operator of the environment, such as particular settings or configurations the system must have, particular functionality the system must provide or support, particular security mechanisms the system must support, and so forth. These can also be "implicit" requirements that that arise because of a particular configuration of the environment. For example, if a host computing device in the environment is using a particular type of file system then it may not be possible for some actions to be performed using that file system (although it may be possible for those same actions to be performed using another file system).

During the design and development phase of the system, SDM document 204 can be used to validate the system for one or more particular environment(s). This is a two-way validation: the system is validated for the environment and the environment is validated for the system. The environment can be validated for the system by comparing the requirements identified in the SDM document 204 with the environment and determining whether all of the requirements are satisfied by the environment. The system can be validated for the environment by comparing the requirements identified in an SDM document for the environment with the system and determining whether all of the requirements are satisfied by the system. If all of the requirements are satisfied by the environment and the system, then the designer or developer knows that the system can be deployed in and will run in the environment. However, if all of the requirements are not satisfied by the environment and/or the system, then the designer or developer is optionally informed of the requirements that were not satisfied, thereby informing the designer or developer of what changes should be made to the SDM document 204 (and correspondingly to the system) and/or to the environment in order for the system to be deployed and run in that environment.

The knowledge regarding deployment of the system that is included in the SDM document 204 describes how the system is to be deployed in one or more environments. The SDM document 204 is made available to a controller 206, which includes a deployment module 208 and a management module 210. In certain embodiments, the SDM document 204 as well as all of the files of the system (e.g., binaries, data, libraries, etc.) needed to install the system are packaged together into a single container (e.g., a single file) referred to as an SDU (System Definition Unit). Controller 206 can be one or more of computing devices 102 of FIG. 1. For example, a single device 102 of FIG. 1 may be the controller for a particular data center, or alternatively the controller responsibilities may be distributed across multiple devices 102.

Deployment module 208 includes services that are used to deploy the system in the environment(s). In FIG. 2, the environment in which the system is deployed (or is deployed on) is one or more target devices 212. Systems may also be deployed to controller 206. These services of deployment module 208 include one or more functions that can be called or invoked to install or deploy one or more systems in the environment.

Different knowledge for deployment in different environments may be included in the SDM document 204. This deployment knowledge describes any changes that need to be made to the environment (e.g., changes to a system registry; folders, directories, or files that need to be created; other setting or configuration parameters of the computing device that need to be set to particular values; and so forth), as well as what files (e.g., program and/or data files) that need to be copied to the computing device(s) in the environment and any operations that need to be performed on those files (e.g., some files may need to be decompressed and/or decrypted). In many implementations, the deployment knowledge in the SDM document 204 includes, for example, information analogous to that presently found in typical setup or installation programs for systems.

During the deployment process, controller 206 generates a record or store of the software and hardware resources involved in the deployment as well as the relationships between them. This record or store can subsequently be used by controller 206 during the management phase.

Management module 210 includes services that are used to manage the system once it is installed in the environment(s). These services of management module 210 include one or more functions that can be called or invoked to manage the systems in the environment. The knowledge regarding management of the system that is included in the SDM document 204 describes how the system is to be managed in one or more environments.

Different knowledge for managing a system in different environments may be included in the SDM document 204. The management knowledge includes any knowledge used in the management or operation of the system. Management involves, for example, configuration (and optionally subsequent reconfiguration), patching and upgrading, maintenance tasks (e.g., backup), health or performance monitoring, and so forth.

Changes to deployed systems are made through management module 210. The services of management module 210 include one or more functions that can be called or invoked to make changes to one or more systems deployed in the environment. By making such changes through the management module 210, several benefits can be realized. One such benefit is that controller 206 can maintain a record of the changes that have been made. Controller 206 may maintain a copy of the SDM document 204 for the system and record in the SDM document 204 any changes that are made to the system. Alternatively, controller 206 may maintain a separate record of the changes made to the system.

This record of changes maintained by controller 206 can simplify subsequent operations, such as solving problems with the system and/or environment, or when having to reinstall the system due to a hardware failure (allowing the system to be reinstalled and returned to running with the same parameters/settings as it had at the time of failure). By having such changes made through controller 206 and by having controller 206 maintain the record, some human error can be removed from the environment (e.g., if the administrator making the change is supposed to log the change in a book but forgets to do so there would be no record of the change—this problem is solved by having controller 206 maintain the record).

Furthermore, by making changes to systems through controller 206, as well as deploying systems through controller 206, controller 206 can serve as the repository of knowledge about the environment, the systems deployed in the environment, and interactions between them. Knowledge regarding the environment and/or systems deployed in the environment can be readily obtained from controller 206. This knowledge can be used to ensure the consistency of the controlled environment by validating that the controlled devices in the environment reflect the state stored in the central controller 206.

It should be noted that in some situations changes may be made to a system and/or environment but are not made through controller 206. For example, a computing device may be accidentally turned off or may fail. In these situations, attempts are made to reflect such changes in controller 206. These changes may be reflected in controller 206 automatically (e.g., a system may run that attempts to detect device failures and use the services of management module 210 to notify controller 206 of such failures) or may be reflected in controller 206 manually (e.g., an administrator may use the services of management module 210 to notify controller 206 of such changes). Alternatively, the changes that were made could be reversed to bring the system and/or portion of the environment back into line with the desired state of the system as recorded by controller 206.

The SDM document 204 can thus be viewed as a "live" document—it can be constantly changing based on changes to the environment and/or changes to the system throughout the lifecycle of the system.

System Definition Model (SDM)

The system definition model (SDM) is a modeling technology used to create definitions of systems. A system is a set of related software and/or hardware resources that work together to accomplish a common function. Example systems include multi-tier line-of-business applications, Web services, e-commerce sites, and enterprise data centers. The SDM provides tools and a context for an application architect, network architect, datacenter architect, or other developer to design distributed computer applications and data centers in an abstract manner. The SDM defines a set of elements that represent functional units of the systems that will eventually be implemented by physical computer resources and software. The SDM also defines elements that are relevant to operators or other individuals that will manage a system. Additionally, the SDM captures data pertinent to development, deployment, and operations. Associated with the SDM elements is a schema that dictates how functional operations represented by the components are to be specified.

A system is composed of resources, endpoints, relationships and sub-systems. Definitions of each of these items are declared in an SDM document. An SDM document is an XML document that contains one or more definitions of systems, resources, endpoints and relationships. Resources may be hardware resources or software resources. Endpoints represent communications across systems. Relationships define associations between systems, resources and endpoints. Sub-systems can be treated as complete systems and are typically part of a larger system.

A system definition captures the basic structure of a dynamic system. It can be viewed as the skeleton on which all other information is added. This structure is typically specified during the development process, by architects and developers, and typically does not change frequently. In addition to the structure, the SDM can contain deployment information, installation processes, schemas for configuration, events and instrumentation, automation tasks, health models, operational policies, etc. Other information can be added by the operations staff, by vendors, and/or by management systems across the lifetime of a distributed system.

SDM Schema Design Specification

Figure 3:
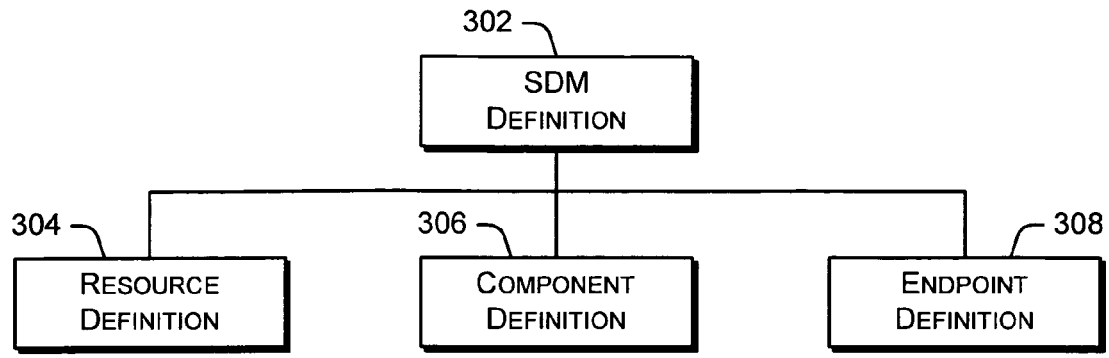
FIG. 3 illustrates an example definition structure defined in the SDM schema design specification.

The SDM is designed to support description of the configuration, interaction and changes to the components in a distributed system (e.g., the modeled system). "Definitions" describe entities that exist in a system and "relationships" identify the links between the various entities. Definitions and relationships are further defined to capture semantic information relevant to the SDM. As shown in FIG. 3, an SDM definition 302 includes three sub-definitions: a resource definition 304, a component definition 306, and an endpoint definition 308.

Figure 4:
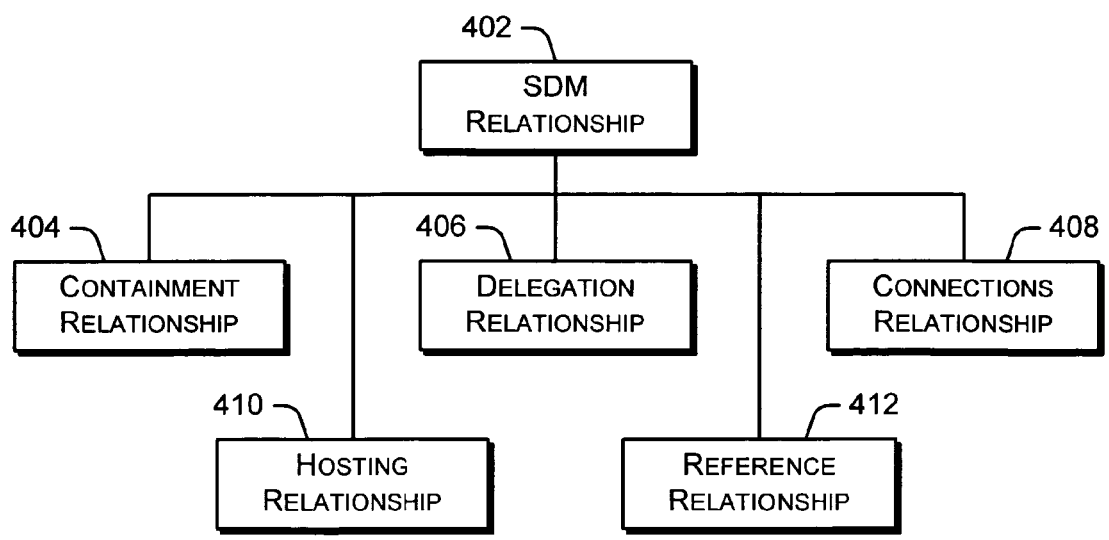
FIG. 4 illustrates an example relationship structure defined in the SDM schema design specification.

As shown in FIG. 4, an SDM relationship 402 includes five sub-relationships: a containment relationship 404, a delegation relationship 406, a connections relationship 408, a hosting relationship 410, and a reference relationship 412. The connections relationship 408 may also be referred to as a "communication relationship". Further details regarding definitions and relationships are provided below.

The SDM includes "abstract definitions" that provide a common categorization of system parts, provide tool support for a wide range of applications and provide the basis for definition checking at design time. A set of abstract definitions provide a comprehensive basis for service design. "Concrete definitions" represent parts of an actual application or data center design. A concrete definition is generated by selecting an abstract definition and providing an implementation that defines the concrete definition's members and setting values for its properties. Distributed applications are generated using collections of these concrete definitions.

The SDM also includes "constraints" that model restrictions based on the allowed set of relationships in which an instance of a relationship can participate. Constraints are useful in describing requirements that depend on the configuration of objects involved in a relationship. For example, a constraint may be used to determine whether participants on each end of a communication protocol are using compatible security settings.

A flow can be identified as part of a definition and/or a resource. This flow is used to control application behavior at runtime by propagating operator settings to the systems, sub-systems, or other components that utilize such settings.

Abstract Definitions and Relationships

Abstract definitions define the building blocks that check application configuration at design time and then deploy and manage an application at run time. These building blocks represent entities that exist in the modeled system. For example, abstract definitions can model files and directories, the configuration inside a web server, or the databases inside a SQL server.

Abstract relationships model the interactions that can occur between abstract definitions. Relationships are binary and directed, identifying the definitions of the instances that participate in manifestations of the relationship. Relationships provide a way of associating entities with one another, thereby allowing the modeling of containment, construction and communication links between entities.

Constraints are used by definitions to constrain the relationships in which they participate. Constraints are further used by relationships to constrain the definitions that can be linked. These constraints can target the definition and settings of participants in a relationship.

The abstract definition space is divided into three categories: components, endpoints and resources. Abstract component definitions describe self-contained independently deployable parts of an application. These definitions represent parts of an application that interact through well-defined communication channels that can cross process and machine boundaries. Abstract endpoint definitions describe the communication endpoints that a component may expose. These abstract endpoint definitions can model all forms of communication that the system is aware of to verify system connectivity at design time and to enable connections at runtime. Abstract resource definitions describe behavior that is contained within a component. Resource definitions may have strong dependencies on other resource definitions. These dependencies can include requiring a specific installation order and initiating runtime interaction through various communication mechanisms.

Abstract definitions include the ability to expose settings. In one embodiment, these settings are name-value pairs that use an XML schema to define the definition of the setting. Settings can be dynamic or static. Static settings are set during the deployment process. Dynamic settings can be changed after deployment. The code responsible for applying settings values to the running system is hosted in the SDM runtime.

The SDM model supports inheritance over abstract definitions. A derived definition can extend the properties exposed by its parent and can set values for its parent's properties. A derived definition can participate in the relationships that identify its parent as a participant.

As mentioned above, relationships are divided in five categories: communication (or connections), containment, delegation, hosting and reference. Communication relationships capture potential communication interactions between abstract endpoint definitions. The existence of a communication relationship indicates that it may be possible for components that expose endpoints of the identified definition to communicate. The actual establishment of the link is subject to constraints on the endpoints and the exposure of the endpoints.

Containment relationships describe the ability of an abstract definition to contain members of other abstract definitions. More specifically, a containment relationship between two abstract definitions A and B allows a concrete definition that implements A to contain a member of a definition that implements B. Containment relationships model the natural nesting structures that occur when developers build applications. By containing a member of another definition, the parent is able to control the lifetime and visibility of the contained definition. All definition instances in the run time space exist as members of other definition instances, forming a completely connected set of instances. Thus, the set of containment relationships describes the allowed containment patterns that occur in the runtime space.

Delegation relationships selectively expose contained members. For example, delegation can expose endpoint members from component definitions. By delegating an endpoint from an inner component, the outer component exposes the ability to communicate using a particular protocol without exposing the implementation behind the protocol.

Hosting and reference relationships represent two forms of dependency relationships. A hosting relationship is used to capture knowledge regarding how to create an instance of a definition on a particular host. The hosting relationship allows the developer to create their own definition in a manner that is independent from the operation of a specific host. This relationship also allows a single definition to be deployed on multiple host types without rewriting the guest definition. The hosting relationship describes a primary dependency between abstract definitions that exists before an instance of a concrete definition is created. Each instance participates as a guest in a hosting relationship, thereby causing the hosting relationships to form a connected tree over the instance space. Reference relationships capture additional dependencies used for parameter flow and for construction ordering.

Concrete Definitions and Relationships

Concrete definitions are created from abstract definitions. Concrete relationships are created from abstract relationships. The combination of abstract definitions and abstract relationships defines a schema for modeling the target system. A concrete definition uses a subset of the abstract definition space to create a reusable configuration of one or more abstract definitions. The abstract definition space can be compared to the schema for a database. In this analogy, the concrete definition space represents a reusable template for a set of rows in the database. The concrete definition is validated against the abstract definition space in the same way that the rows in the database are validated against the constraints of the schema, such as foreign keys, etc. A developer can infer knowledge of the concrete definition from knowledge of the abstract definition. Thus, tools associated with the abstract definition can operate with many implementations that are derived from that abstract definition. For example, a tool that knows about abstract Web services can operate with any Web service deployed into a datacenter without requiring additional information from the developer.

Each concrete definition provides an implementation for a specific abstract definition that includes extensions to the settings schema, values for settings, declarations for definition and relationship members, and constraints on the relationships in which the definition can participate. The behavior of the concrete definition follows the definition of the abstract definition. In particular, abstract component definitions become component definitions, abstract endpoint definitions become endpoint definitions and abstract resource definitions become resource definitions.

Each concrete relationship provides an implementation for a specific abstract relationship that includes a settings schema and settings values, nested members of the same relationship category (e.g., hosting, containment, or communication), and constraints on the definitions that can participate in the relationship.

Concrete hosting relationships define a set of hosting relationships that can map the members of one concrete definition onto another concrete definition. For example, a concrete hosting relationship can identify the bindings between a web application and the IIS host to which it will be deployed. More than one hosting relationship can exist for a particular definition, thereby allowing the developer to define deployments for specific topologies.

A concrete definition can declare members of other concrete or abstract definitions—referred to as "definition members". These definition members are then referenced from "relationship members" that define the relationships between the definition members. Definition members include references to instances of a particular definition. Settings flow can provide values for the definition or can constrain the construction parameters used when creating the definition. When declaring a definition member, the user (e.g., developer) can decide whether the definition member is created at the same time the outer component is created (referred to as "value semantics") or whether the definition member is created by an explicit new operation that occurs at a later time (referred to as "reference semantics").

Relationship members define the relationships that definition members will participate in when they are created. If a definition member is contained in the concrete definition, then a containment relationship member is declared between the definition member and this reference for the outer definition. If the definition member is delegated, then a delegation relationship member would be defined between the definition member and a nested definition member. Communication relationship members can be declared between endpoints on definition members and dependency relationship members (reference and hosting) can be declared between definition members or nested definition members.

Relationship constraints narrow the set of relationships in which a particular definition is willing to participate. Relationship constraints identify constraints on a particular relationship and on the participants at the other end of the relationship.

Instance Space

The instance space stored in the SDM runtime identifies the current state of the modeled system. The SDM runtime contains a record of the instances that have been created and the relationships between those instances. Each instance has an associated version history that links each version to a change request. A change request is the process that creates a new instance. The change request defines a set of create, update and delete requests for definitions and relationships associated with specific members of an existing instance. The root is handled as a special case.

The change request is expanded by the runtime, verified against one or more constraints, and then constructed. The expansion process identifies definition and relationship instances that are constructed implicitly as part of the construction request of the containing definition. As part of the expansion process, the settings flow is evaluated across all relationships. The verification step checks that all required relationships exist and that the relationships fulfill the necessary constraints. Finally, the construction process determines an appropriate ordering over the deployment, update, or removal of each instance. The construction process then, in the correct sequence, passes each instance to an instance manager to perform the appropriate action. Further discussion of changes and revision may be found in the respective section of the description.

Data centers can be created using multiple software components. One or more connections are configured between the multiple software components. Some of these software components may function as hosts for the application layer. Example component definitions in the host layer include IIS, SQL, AD, EXCHANGE, DNS and Biztalk.

The network/OS/storage layer supports the construction of data center networks and platforms. This layer also supports the configuration of a network security model, configuration of the operating system platform and association of one or more storage devices with the operating system platform. Example component definitions in the network/OS/storage layer include VLAN, Windows, Filter and Storage.

The hardware layer identifies the definitions of systems that exist in the data center and the physical connections that exist between those systems. To satisfy the relationships needed by a particular component, that component is bound to a host component that has matching capabilities. This process is referred to as "logical placement". At deployment time, instances of the guest component are positioned on instances of the host component. This process is referred to as "physical placement".

Figure 5:
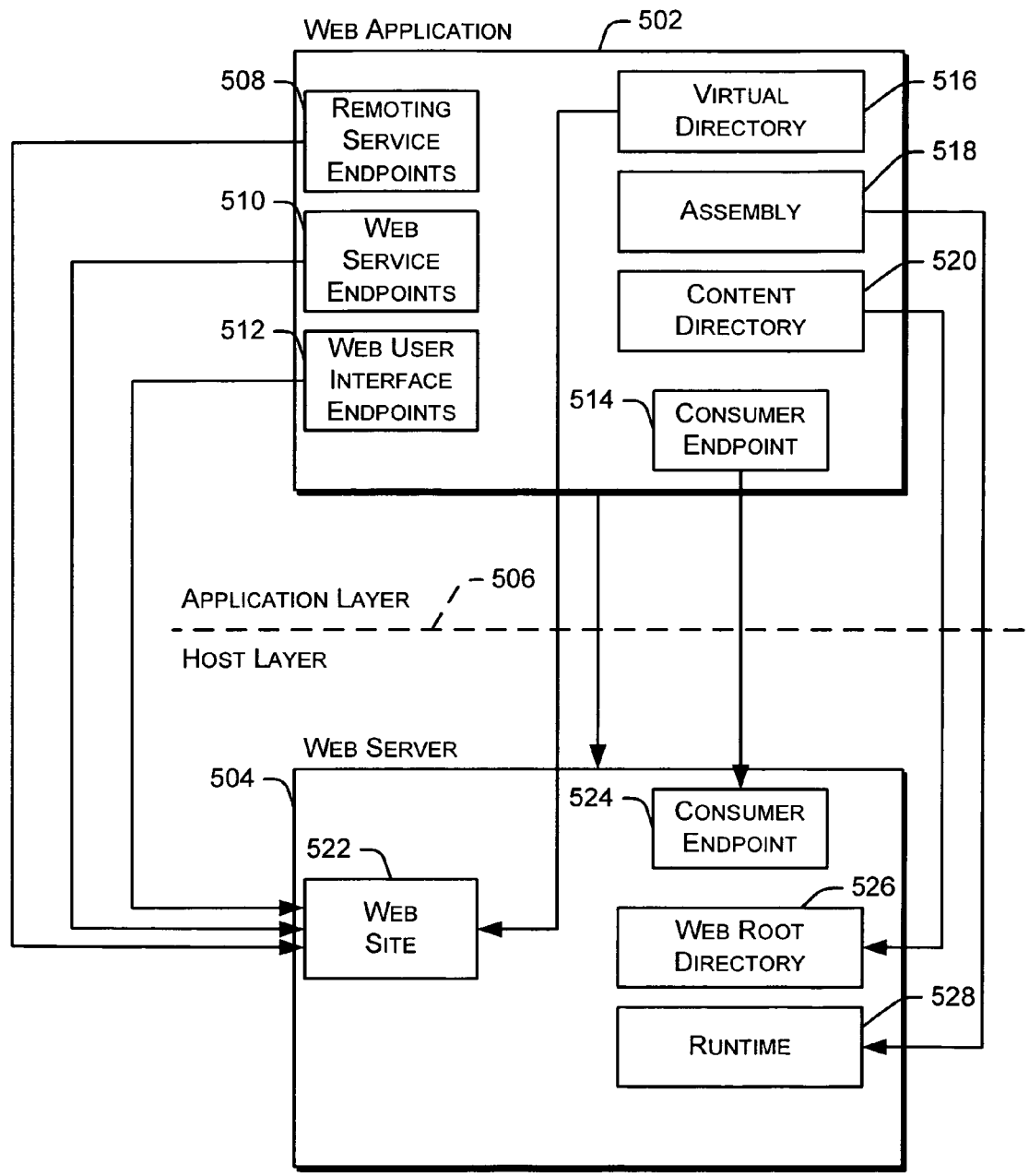
FIG. 5 illustrates an example of mapping a Web application to a Web server host.

FIG. 5 illustrates an example of mapping a Web application 502 to a Web server host 504. A boundary identified by broken line 506 separates an application layer from a host layer. Web application 502, contains remoting service endpoints 508, Web service endpoints 510 and Web user interface endpoints 512, all of which map to a Web site 522 in Web server 504. Additionally, a virtual directory 516 in Web application 502 maps to Web site 522. Web application 502 also includes a consumer endpoint 514 that maps to a consumer endpoint 524 in Web server 504. An assembly portion 518 of Web application 502 maps to a runtime portion 528 of Web server 504. A content directory 520 in Web application 502 maps to a Web root directory 526 in Web server 504.

A process for managing changes to a distributed system is associated with the SDM model. Changes to the distributed system are driven by a change request that passes through one or more processing steps before the actions in the request are distributed and executed against target systems.

Figure 6:
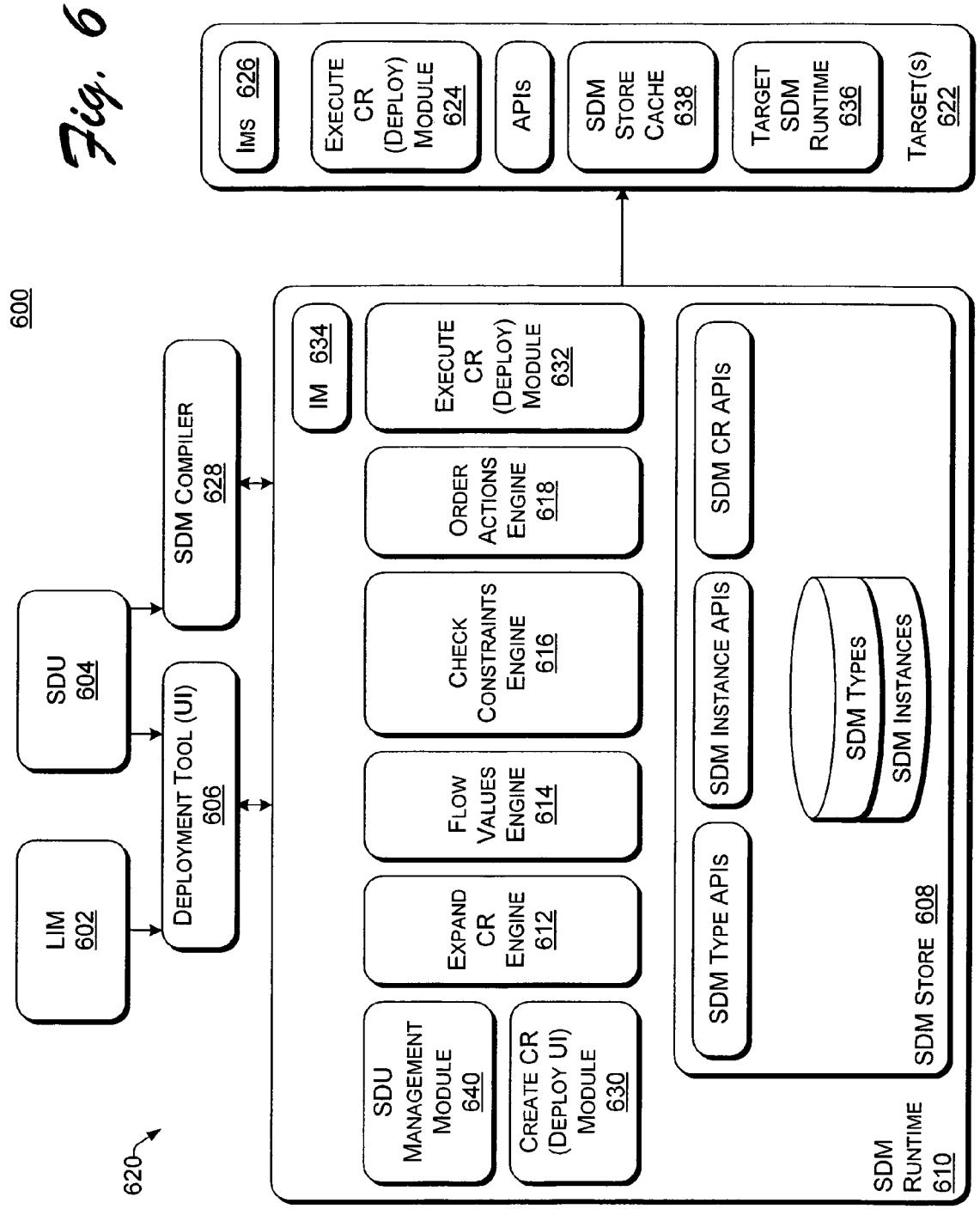
FIG. 6 illustrates an example architecture using an SDM runtime.

FIG. 6 illustrates an example architecture 600 using an SDM runtime. Architecture 600 is an example of architecture 200 of FIG. 2 using an SDM runtime 610 as well as the example implementation of the SDM discussed below in the section "Example Implementation". The SDM runtime 610 contains a set of components and processes for accepting and validating SDM files, loading SDUs (System Definition Units—which are packages of one or more SDM files and their related files), creating and executing SDM Change Requests and deploying SDM based systems into target environments. The runtime functionality allows systems described using the SDM to be defined and validated, deployed to a set of computing devices, and managed.

The following is a brief, functional discussion of how the components in FIG. 6 work together. An operator or administrator is able to describe an environment into which applications can be deployed, such as the topology of a data center. The operator or administrator produces an SDM file describing the environment, the file being referred to as the "logical infrastructure" (LIM) 602, or as a data center description or data center model. This SDM file can be generated using any of a variety of development systems, such as the Visual Studio® development system available from Microsoft® Corporation of Redmond, Wash.

Additionally, an application developer is able to design and develop their application using any of a variety of development systems, such as the Visual Studio® development system. As the developer defines components of the application and how these components relate to one another, the developer is able to validate the application description against the datacenter description 602. This is also referred to as "Design Time Validation".

Once the application is complete, the developer saves the description in an SDM and requests that the application be packaged for deployment as an SDU 604. The SDU includes the application SDM as well as the application binaries and other referenced files used to install the application.

The LIM 602 and SDU 604 are fed to deployment tool 606 of a controller device 620 for deployment. Deployment tool 606 includes a user interface (UI) to enable an operator to load the desired SDU 604. Deployment tool 606 works with create CR module 630 to install the application associated with the SDU 604 in accordance with the information in the SDM within SDU 604. Additionally, SDM definitions and instances from SDU 604 are populated in a store 608 of the SDM runtime 610. SDUs are managed in SDM runtime 610 by SDU management module 640, which makes the appropriate portions of the SDUs available to other components of runtime 610 and target(s) 622.

The operator can also specify what actions he or she wants to take on the targets 622 (e.g., target computing devices) on which the application is being deployed. The operator can do this via a deployment file, which is also referred to herein as a Change Request (CR). The CR is run through one or more engines 612, 614, 616, and 618. Generally, expand CR engine 612 expands the CR to identify all associated components as well as their connections and actions, flow values engine 614 flows values for the components (such as connection strings), check constraints engine 616 checks constraints between the environment and the application, and order actions engine 618 specifies the order for all of the necessary actions for the CR.

To initiate change to the system (including deploying an application) or validation of a model, an operator or process submits a CR. The CR contains a set of actions that the operator wants performed over the instances in the runtime 610. These actions can be, for example, create actions, update actions, and/or delete actions.

In addition to user or operator initiated change requests, there may also be expansion/automatically generated change requests that are generated as part of the expansion process, discussed in more detail below. Regardless of their source, the change requests, once fully expanded and checked, are executed by sending actions to the targets 622, such as: discover, install, uninstall and change a target instance.

The CR is treated as an atomic set of actions that complete or fail as a group. This allows, for example, the constraint checking engine 616 to consider all actions when testing validity.

In design time validation, the CR will be created by the SDM Compiler 628 and will contain one or the minimum of each SDM component in the SDM file. This CR of create instance commands will flow through the expansion engine 612, the flow values engine 614, and the constraint checking engine 616. Errors found in these three phases will be returned to the user via the development system he or she is using.

In deployment, the operator will create a CR with the UI presented by deployment tool 606. The CR will flow through all the engines 612, 614, 616, and 618 in the SDM runtime 610, and the appropriate actions and information will be sent by CR module 632 to the appropriate target(s) 622, where the request is executed (e.g., the application is installed). The appropriate target(s) 622 for a particular installation are typically those target(s) on which the application is to be installed.

When beginning to process a CR, in a definition resolution phase, create CR module 630 resolves all definitions and members that are referenced in the change request. The change request will assume that these are already loaded by the runtime 610; create CR module 630 initiates a load/compile action if they do not exist. Create CR module 630 also implements a path resolution phase where references to existing instances and instances defined by create actions within the change request are resolved.

The expansion performed by expansion engine 612 is a process where, given a change request, all the remaining actions required to execute the request are populated. In general, these actions are construction and destruction actions for definition and relationship instances. The operator could optionally provide details for all the actions required to construct or destroy an instance, or alternatively portions of the process can be automated: e.g., the operator provides key information about the changes he or she wants by identifying actions on members (e.g., by Reference members), and the remainder of the actions are filled in on nested members (e.g., by Reference and by Value members) and relationships. By way of another example, automated expansion can also refer to external resource managers that may make deployment decisions based on choosing devices with available resources, locating the application close to the data it requires, and so forth.

Expansion engine 612 also performs "auto writing". During auto writing, engine 612 analyzes the scale invariant grouping of components and compound components specified in the SDM and determines how the components should be grouped and interconnected when scaled to the requested level.

Expansion engine 612 also performs value member expansion, reference member expansion (discovery), and relationship expansion.

Value member expansion refers to identification of all of the non-reference definition members. The cardinality of these members are noted and, since all the required parameters are known, for each member create requests are added to the change request for those members whose parent is being created. If the change request contains destruction operations, then destruction operations are added for all their contained instances.

Reference member expansion refers to reference members (as opposed to non-reference definition members). The cardinality of reference members is often undefined and they can have deployment time settings that require values in order for the instance to be constructed. So the process of expanding a reference member (e.g., a by Reference member) can require more information about the instance than the runtime is in a position to provide.

Related to reference member expansion is a process referred to as discovery, which is a process used to find instances that have already been deployed. Discovery is an action typically initiated by an operator of the environment. For example, during an install request, expansion engine 612 determines if the instance already exists, if so determines what exists and if not then creates it. An instance manager (IM) 634 on the controller 620 communicates with the instance managers 626 on the target device 622 to initiate a discovery process. The discovery process returns data regarding the instance from the target device 622 to the controller 620.

The process of discovery populates reference definition members as part of a construction or update action. Typically, only reference members with object managers (instance managers that also do discovery) that support discovery participate in this process.

When a new instance is discovered a check is made that the instance does not already exist in the SDM database using instance specific key values. Once it is known that it is a new instance, the instance is classified according to the definitions of the members being discovered. If the instance does not match a member or there is an ambiguous match then the member reference is left blank and the instance is marked as offline and incomplete.

Relationship expansion refers to, once all the definition instances that will be constructed are known, creating relationship instances that bind the definition instances together. If definition instances are being destroyed, all relationship instances that reference the definition instances are removed.

To create the relationships the member space is used to identify the configurations of the relationships that should exist between the instances. Where the definition members have cardinality greater than one the topology of the relationships is inferred from the base relationship definition. For example, for communication relationship an "auto wiring" can be done, and for host relationships a host is picked based on the algorithm associated with the hosting relationship.

During a flow stage, flow values engine 614 evaluates flow across all the relationship instances. Flow values engine 614 may add update requests to the change request for instances that were affected by any altered parameter flow. Engine 614 evaluates flow by determining the set of instances that have updated settings as a result of the change request. For each of these, any outgoing settings flows that depend on the modified settings are evaluated and the target nodes added to the set of changed instances. The process continues until the set is empty or the set contains a cycle.

After the flow stated, a process of duplicate detection is performed. The duplicate detection may be performed by one of the engines illustrated in FIG. 6 (e.g., flow values engine 614 or check constraints engine 616), or alternatively by another engine not shown in FIG. 6 (e.g., a duplicate detection engine may be included in SDM runtime 610). The process of duplicate detection matches expanded instances against instances that already exist in the SDM data store. For example, the process detects if another application has installed a shared file. When an instance that already exists is detected, one of several actions can be taken depending on the version of the existing instance: the install can be failed; the instance can be reference counted; the instance can be upgraded; or the installation can be performed side-by-side.

Check constraints engine 616 implements a constraint evaluation phase in which all the constraints in the model are checked to see if they will still be valid after the change request has been processed.

After check constraints engine 616 finishes the constraint evaluation phase, a complete list of actions is available. So, order actions engine 618 can use the relationships between components to determine a valid change ordering. Any of a variety of algorithms can be used to make this determination.

Once order actions engine 618 is finished determining the ordering, deployment can be carried out by distributing subsets of the ordered set of actions that are machine specific. Once the actions have been ordered and grouped by machine, the actions as well as a copy of the necessary portion of the SDM runtime store 608 with instance information are sent to a target computing device 622. The SDM can be stored temporarily at the target device in a store cache 638.

The target computing device includes a target portion 636 of the SDM runtime that communicates with SDM runtime 610. The target computing device 622 also includes an agent that contains an execution engine 624 and can communicate with the appropriate instance managers (IMs) 626 on the target device to make changes on the target, such as create, update, and delete actions. Each action is sent as an atomic call to the instance manager 626 and the instance manager 626 returns a status message and for some actions, also returns data (e.g., for discovery). Once all the actions are completed on target 622, the target's agent returns any errors and status to the controller 620. The controller 610 then uses this information to update the SDM runtime store 608.

As discussed above, change is carried out by breaking the change requests down into distributable parts based on the relationships that are affected. Once all the parts are completed (or after one or more has failed) the results are collated in the runtime 610 and a summary returned to the operator. In the event of a failure, all the actions can be "rolled back" and the system returned to the state it was in before the change was initiated.

In certain embodiments, during design time validation discussed above, an SDM Compiler 628 receives an SDM file, creates a test CR, runs the test CR through the expand, flow values and check constraints engines of the SDM runtime, and returns any errors to the development system. This process provides SDM validation for deployment during design time for the developer.

The public interface to SDM runtime 610 and/or controller 620 is through an object model (APIs) library. The library is a managed code object model and allows the following to be performed:

Manage the SDMs in the runtime—SDM files can be loaded into the runtime. SDMs are immutable and are loaded one at a time (i.e., an SDM file can be loaded rather than only parts of the file (e.g., individual ones of the individual definitions, classes or mappings from the SDM file)). SDMs can be deleted from the runtime and an XML document for an SDM in the runtime can be produced.

Manage the SDUs known by the runtime.

Manage SDM definitions—find and reflect on SDM elements (from an SDM loaded in the runtime). There is no public API provided for authoring a new SDM (i.e., this is a read only object model over the immutable elements of the SDM). This includes SDMs, SDUs, identities, versions, classes, definitions, binding/mappings and versioning policy.

Manage SDM instances—find and reflect on instances of components, endpoints, resources and relationships. In the instance space each instance can be identified by a GUID, a stable path or an array based path. The paths are strings and can be relative. These identifiers, including relative paths allows instances to be found and referenced in documents such as the change request document.

Manipulate instances—make changes to SDM instances, including creating, changing topology, upgrading, changing settings and deleting. Instance changes are made within the bounds of a change request which provides an atomic unit of update so that any errors or constraint violations will result in the entire request failing. Instance requests also allow for instances to exist temporarily without a binding to a host, as an instance must have a host when the request is committed. It also allows for many operations that will affect a single component's installation or settings to be performed and have the installation or settings update deferred until commit so that a single update occurs on the component. The SDM model checking is performed prior to or at change request commit time and the commit will fail on any model or constraint violations.

Load a change request—a change request is a document, for example an XML file, that represents a set of instance space operations. This document can take advantage of relative paths to be a reusable 'script' for creating or deleting application instances.

Find and reflect on change requests—including getting the installation/update tasks and all error information, and retrying the installation/update of components affected by the request.

Generate a change request document from a change request in the database. Such documents are somewhat portable.

Subscribe to events on change request tasks, such as progress, log or status updated. The lifetime of these event subscriptions limited by the lifetime of the process that loaded the client library (i.e. these are regular CLR events).

The SDM runtime engine performs the reasoning on the SDM model and the functions surfaced by the APIs. The library communicates to the runtime engine as a web service with fairly coarse calls such as load SDM, create component instance and get entire SDM (for reflecting on SDM entities). The format of many of the parameters for this web service is XML with the same schema for SDM files. The engine may also perform checks on permissions.

The controller 620 can make use of Instance Managers (IMs), which can be associated with any definition or relationship in the model. IMs may perform one or more of the following roles:

Support deployment of the instance.

Support validation of the instance once it has been deployed (auditing).

Support discovery of already deployed instances that were not deployed through the runtime.

Support flow of setting values.

Support evaluation of constraints.

Support expansion of a change request.

Support presentation of the instance to a user as a CLR class through the API.

For deployment, an instance manager (IM) plug-in on controller 620 is associated with a class host relation and is separate from the plug-in used in the development system that provides the design experience for the classes and produces the associated binaries in the SDU 604 and the settings schema. Instance managers are supplied to the SDM runtime

610 as CLR classes (e.g., in a dll assembly) that implement an instance manager interface or inherit from abstract class. An SDM Instance Manager, also referred to as an Instance Manager (IM) plug-in, provides the following functions to the controller 620:

- Generates the files and commands (tasks) to install, uninstall or reinstall component instances on their hosts—When a change request results in a new component instance, removal of a component instance or a change to a component that requires an uninstall and reinstall, it is the instance manager that takes the settings for the instance, the host instance, the definitions associated with the component and the binaries associated with those definitions in the SDU 604 and produces the files and commands needed to perform the install or uninstall on a target server ready for either manual execution or dispatch via the deployment engine.
- Generates the files and commands (e.g., tasks) to update a component instance when its settings change or when the view from one of its endpoints changes (e.g., due to communication relationship topology changes or a visible endpoint has settings changed)
- Maps the endpoint instances visible on a component instance's endpoints to settings on component instance—In the SDM a component instance has endpoint instances that, as a result of some communication relationship topology, can see other endpoint instances. The details of the other endpoint instances are mapped to settings that the component instance can fetch at runtime, usually so that it can bind to it. For example, a web site may have a database client endpoint instance so a communication relationship can be established with a database. When correctly established its database client endpoint is able to see a single database server endpoint instance and the settings on that server endpoint. This information is used by the instance manager to place a connection string for the server in a configuration file under the name of the client endpoint. The end result is that code simply reads the connection string for the database from its configuration settings.
- Generates the files and commands (tasks) to audit a component instance—Auditing confirms existence, correct settings. This may apply to host instance settings also.
- For any task will report status—The IM will translate the output captured, either partial or complete, and provide the status of the task as success, failure or incomplete and optionally offer progress on incomplete (% or last response), details on failure (error message) and a human readable log on any status. By going back to the instance manager to interpret the output of a task, the instance manager is free to have its tasks log structured information (for example, as XML or even SOAP) rather than trying to have to produce sufficient logging for diagnosis while keeping it human readable.
- The instance managers may also provide code that does the constraint checking between hosts and their guests. Installers may use a common constraint language, for example based on XML, XPath and XQuery.

Model and System State Synchronization

As described previously, model based management is an approach to modeling a system in which a strongly-typed model of the system is created and then management actions are applied as transacted changes to an instance space in the model. The model framework is then responsible for applying these changes to the actual physical system, i.e., the system being modeled. The model framework may also manage concurrency and locking to ensure that conflicting changes do not occur.

The SDM for a modeled system includes a definition space and an instance space. The definition space describes the types of instances that may exist and the relationships that are possible between the instances. The instance space represents the current, future and past configuration of the modeled system. For example, a service instance in the SDM may have property values that define the service name and the user context under which the service should execute. The corresponding service configuration as stored in the actual operating system may reflect the same values. If the model is updated, then the actual service should be updated and if the service is updated directly, then the model should be updated. In this way, the SDM infrastructure may keep the model and the modeled system synchronized by either changing the model (i.e., discovery) or by changing the modeled system (i.e., configuration).

Figure 7:
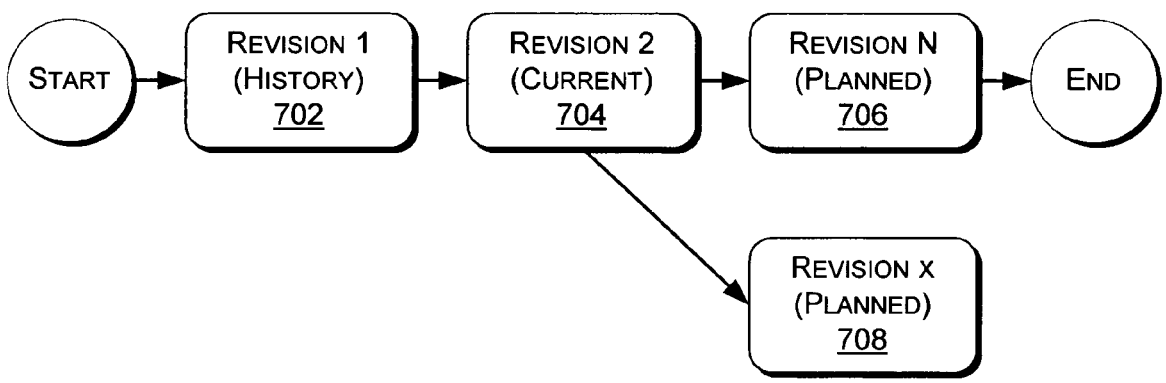
FIG. 7 illustrates an exemplary life of an instance in a model.

FIG. 7 illustrates an exemplary life of an instance 700 in a model. An instance, as described above, is an instantiation of a type in the SDM model which stores property values and identifies members and the relationships, in which, it participates. The code associated with an instance provides the behavior that allows the state of an instance to affect the configuration of the modeled system.

Each instance in the SDM model may be stored as a series of revisions 702-708 to the instance state. First the instance is created, then its configuration may be revised a number of times (e.g., revisions 702-708) until it is finally deleted. With the exception of the first revision, each new revision is defined with respect to a previous revision of the instance. A revision may describe changes to property values and the members of an instance and the relationships, with which, the instance participates.

At any point in time there is a single revision (e.g., revision 704) that is marked as the current revision for the instance. Additionally, there may be a number of planned revisions (e.g., revisions 706, 708) to the instance which are stored in the model. However, historical revisions to the instance are described by a single linear sequence.

Figure 8:
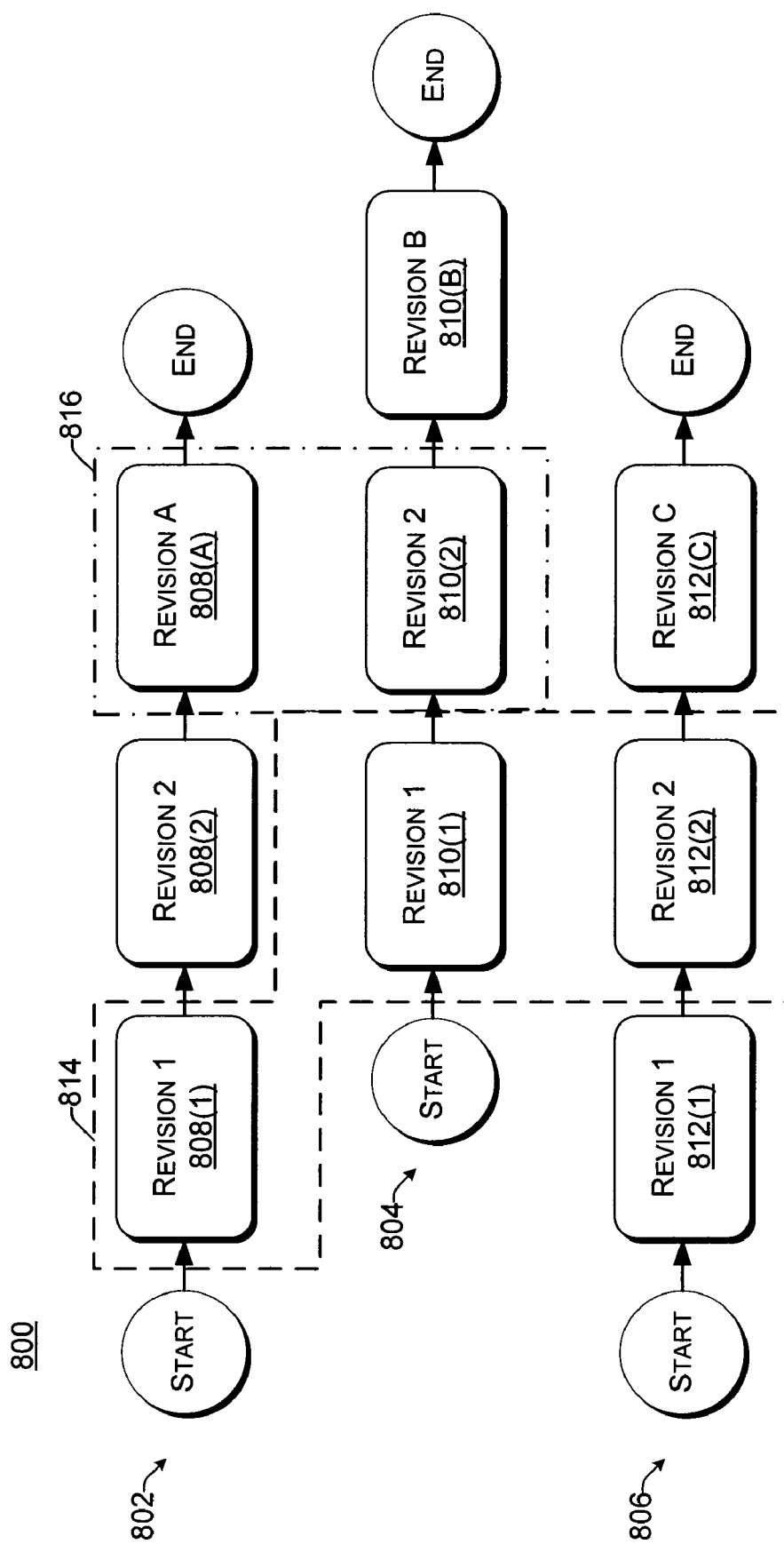
FIG. 8 illustrates a change to an exemplary instance space.

FIG. 8 illustrates a change to an exemplary instance space 800. The instance space 800 is illustrated as including a plurality of instances 802-806, each of which has an associated set of revisions 808(1)-808(A), 810(1)-810(B), 812(1)-812(C). A change to the instance space 800 may be described as a set of revisions to instances 802-806 in the model, with each revision of an instance being associated with a single change. For example, revision 808(1), revision 810(1) and revision 812(2) are associated with a change 814. Likewise, revision 808(A), Revision 810(2) and revision 812(c) are also associated with another change 816.

In an implementation, when a change is committed, each instance revision (e.g., revisions 808(1), 810(1), 812(2)) in the change (e.g., change 814) becomes the current revision for the instance space 800. In other words, the change 814 is considered an atomic unit such that should any one of the revisions (e.g., revisions 808(1), 810(1), 812(2)) in the change 814 fail, the entire change 814 fails as previously described in relation to FIG. 6.

Changes may also have a variety of other transactional properties. For example, if two or more changes try to update the same set of instances, only one of the changes will succeed. In another example, if a change fails, all instances will be reverted to the revision prior to the revision in the change.

Thus, each revision also has a defined lifecycle, further discussion of which may be found in relation to the following figure.

Figure 9:
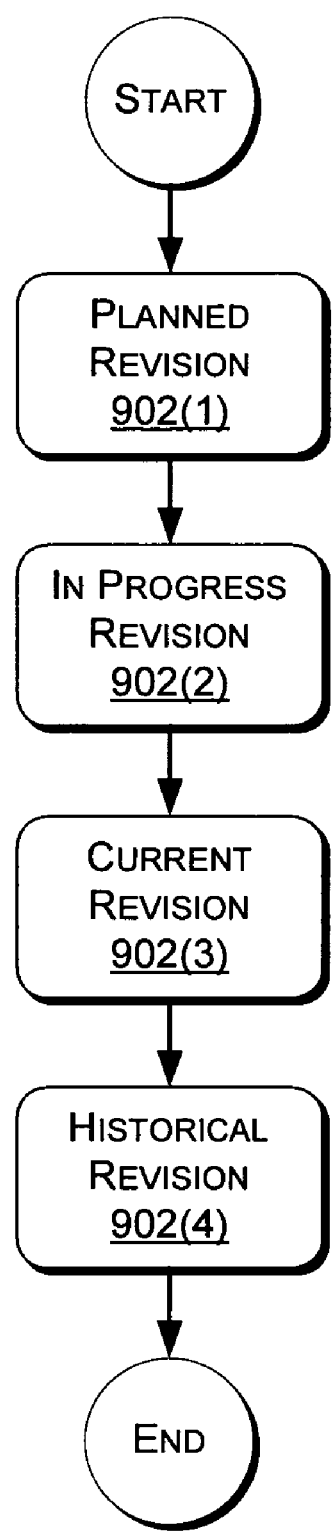
FIG. 9 illustrates an exemplary lifecycle of a revision.

FIG. 9 illustrates an exemplary lifecycle 900 of a revision. A revision starts off as a planned revision 902(1) to an instance. As the change is applied, it moves into an "in progress" state such that the revision is an "in progress" revision 902(2). This is utilized to lock the respective instance, thereby preventing another change (i.e., a revision in another change) from updating the instance. A revision may move into the in progress state if the revision upon which it is based is current.

If the change is successful, then the revision moves from the in progress state (i.e., is an in progress revision 902(2)) to a "current" state and thus may now be considered a current revision 902(3). When in the "current" state, other changes may then be applied to the corresponding instance. If another change successfully updates the instance, then the current revision 902(3) will move into a "history" state (i.e., is now a historical revision 902(4)) and is replaced by the new instance revision. An instance can move from the history state to the current state if the revision that followed it is reverted. In other words, the historical revision 902(4) may be made the current revision 902(3) if a following revision is revoked, such as due to failure of another revision included in a change. Thus, as shown in FIG. 9, a revision may progress through the states of "planned", "in progress", "current" and "history" during its lifecycle 900.

Figure 10:
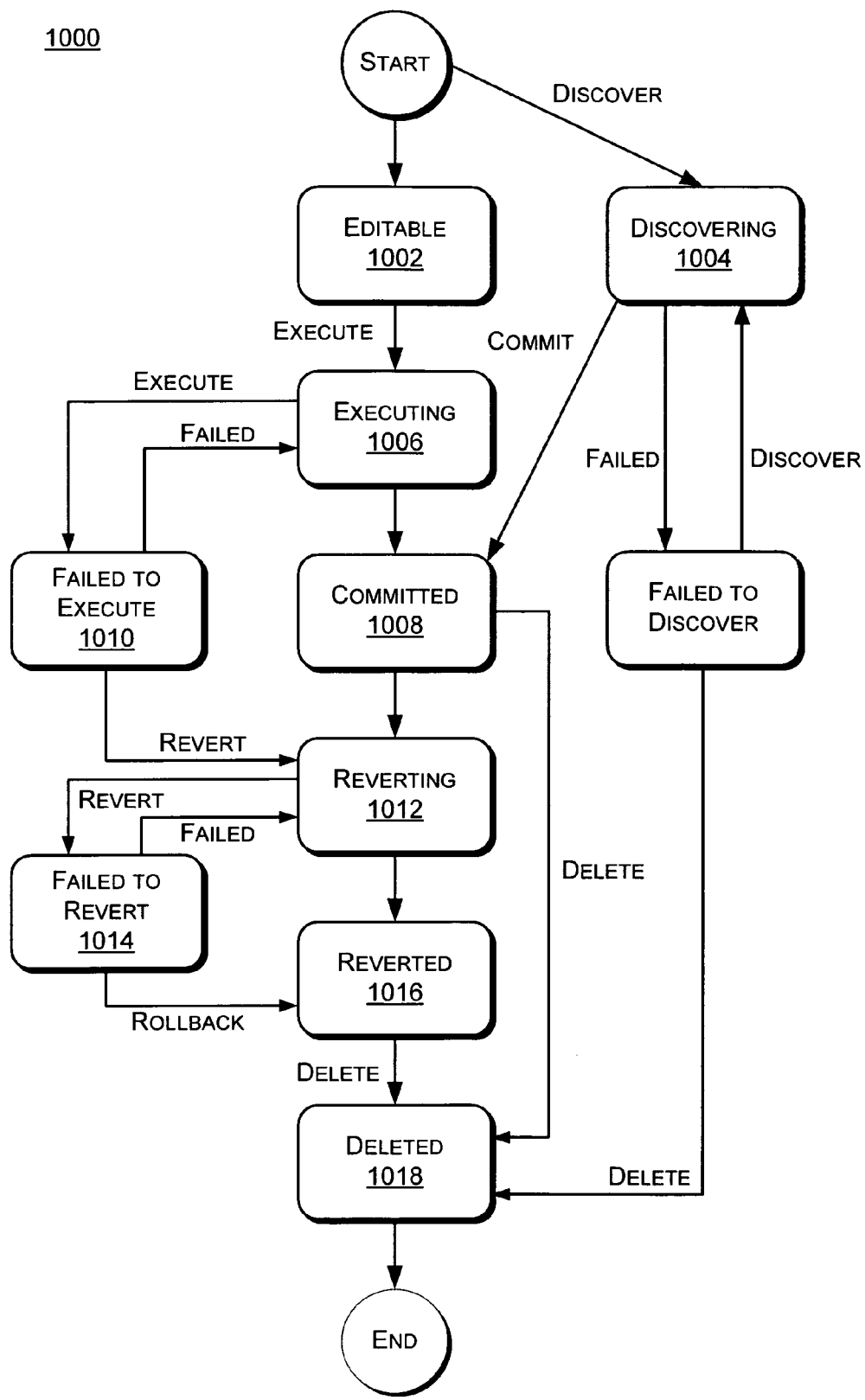
FIG. 10 illustrates an exemplary lifecycle of a change.

FIG. 10 illustrates an exemplary lifecycle 1000 of a change. Changes may be made to a modeled system and propagated to the system being modeled such that the model is utilized to drive the system being modeled, in what may be referred to as a "configuration" change. Thus, in this instance the process of committing a change not only affects the model instance space, it is the mechanism by which configuration updates are made to the modeled system. When a change is being executed, all the updates recorded by a revision to an instance may be applied to the model system through code associated with the instance. Thus, a change-update transaction may encompass updates to both the model and to the modeled system. In an implementation, if a configuration change fails at any point during the update process, then both the SDM instances and the modeled system are reverted to a previous state (i.e., the history state) prior to the implementation of the change.

Changes may also be made to the model based on changes that were made directly to the modeled system. Therefore, in order to synchronize the model to changes in the modeled system, a mechanism referred to as "discovery" may be employed that allows the SDM to be updated in response to changes in the modeled system without updating the modeled system. For example, the discovery process may be implemented by creating changes to the instance space, such that the revisions are applied to the instance space and not to the modeled system. In this example, the revisions pass through the "in progress" state without updating the associated modeled system component.

In the example of FIG. 10, the lifecycle 1000 of the change either starts off in an editable state 1002 (e.g., a configuration action is being created against the model) or a discovering state 1004, e.g., by discovering updates to the model based on existing changes to the modeled system. In both states, a set of revisions are associated with the change.

When configuring the model and the modeled system, a move is made to an executing state 1006 to apply the change. At this point, each of the instance revisions is marked as "in progress". Discovery 1004, however, skips this state and moves directly to a committed 1008 state, assuming that each of the instances that are being revised is not locked by another change.

When executing 1006 or discovery 1004 succeeds, a move is made to the committed state 1008 and the instance revisions associated with the change become current. If the executing 1006 fails 1010, the executing 1006 may be retried or the changes to the model may be reverted in the reverting 1012 state. In the reverting 1012 state, the changes made to the instances associated with the change are reversed. Like the executing state 1006, if the reverting 1012 fails 1014 it may be retried to cause the change to be moved to a reverted 1016 state.

Finally a change may be deleted 1018, which removes both the change and all associated instance revisions from the model. In an implementation, this action may be taken if all the revisions are either in the planned or the history state. Further discussion of configuration and discovery changes may be found in relation to the following exemplary procedures.

Exemplary Procedures

The following discussion describes synchronization techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 11:
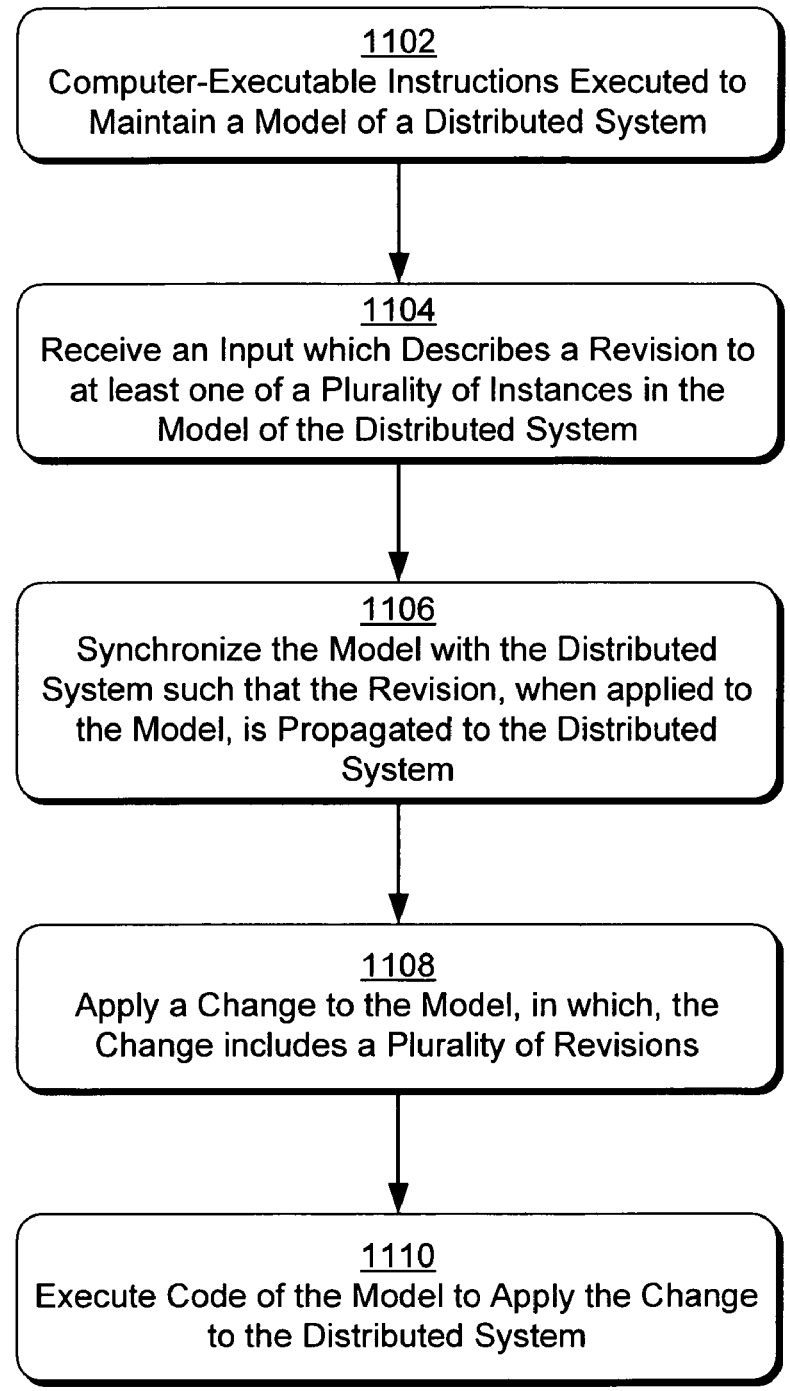
FIG. 11 is a flow diagram depicting an exemplary procedure in which a model is maintained that is synchronized with a modeled distributed system to cause changes made to the model to affect the distributed system.

FIG. 11 depicts an exemplary procedure 1100 in which a model is maintained that is synchronized with a modeled distributed system to cause changes made to the model to affect the distributed system. Computer-executable instructions are executed to maintain a model of a distributed system (block 1102). For example, the computer-executable instructions may maintain a model of hardware and software resources of the distributed system. The model may be defined through use of a plurality of instances, one or more of which are described through a series of revision which describe a historical, current and planned state of a respective instance. Thus, state changes of the model may reflect past, current and future configurations of the distributed system being modeled.

An input is received which describes a revision to at least one of a plurality of instances in the model of the distributed system (block 1104). For example, the input may originate from an operator through interaction with a user interface to describe a configuration change that is desired in the distributed system. The model may then be synchronized with the distributed system such that the revision, when applied to the model, is propagated to the distributed system (block 1106). For example, underlying code of the model may automatically cause configuration changes made to the model to be applied to the distributed system such that the model and the distributed system are synchronized. Although a single revision was described, the revision may also be included as a part of a plurality of revisions which form a change as previously described.

For example, a change may be applied to the model, in which the change includes a plurality of revisions (block 1108). Each of the revisions may correspond to a respective instance. Code (i.e., computer-executable instructions) of the model is then executed to apply the change to the distributed system (block 1110). In this way, an operator may make changes to the model and have those changes automatically propagated to the system being modeled without further input from the operator. As previously described, the changes may be applied such that the change is successful when each of the plurality of revisions is successfully applied. If not successful, the instances of the model may return to a previous revision as described in relation to FIG. 10.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the synchronization techniques described above are platform-independent, meaning that the techniques may be implemented on a variety of commercial computing platforms having a variety of processors.

Exemplary Distributed System

Figure 12:
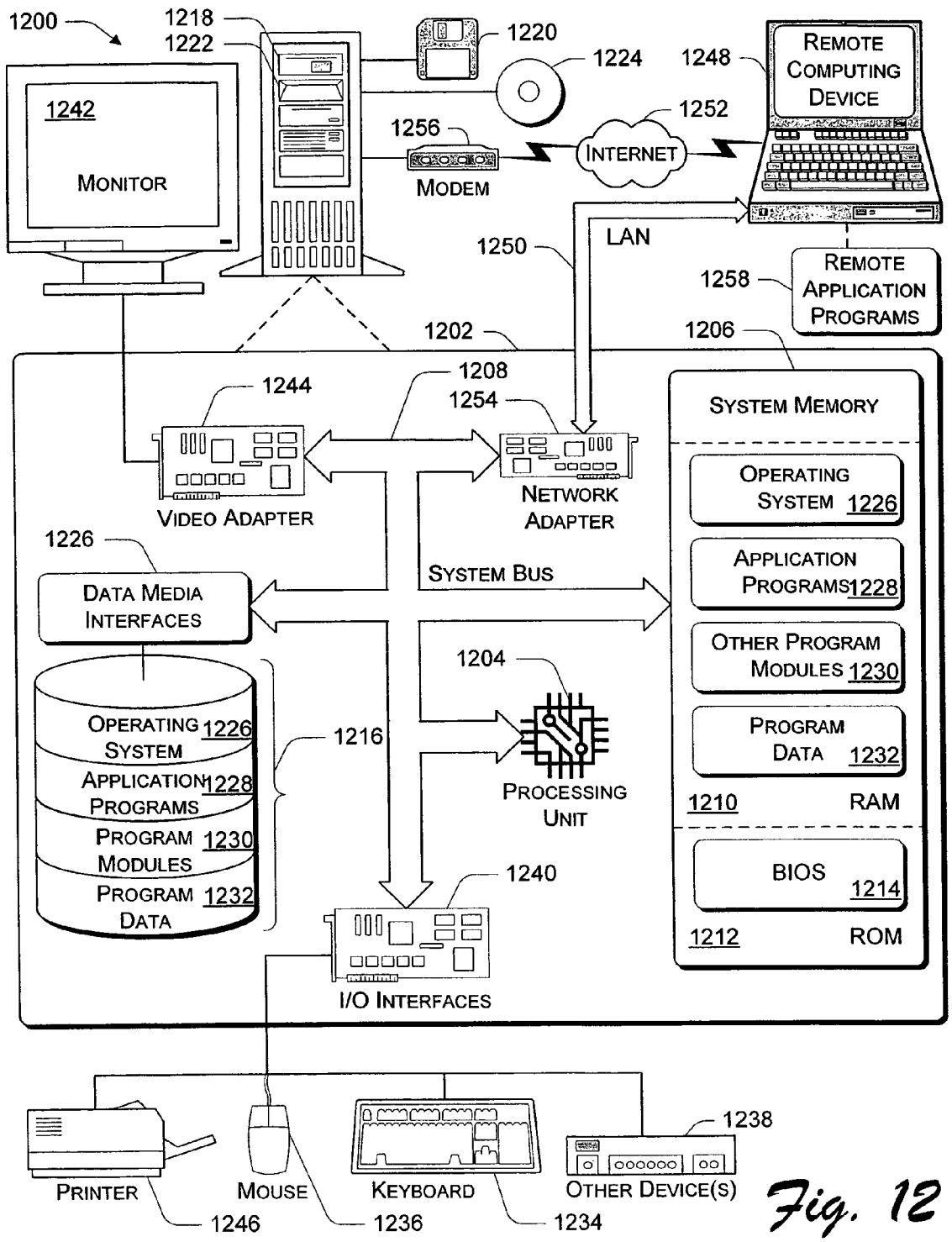
FIG. 12 illustrates an exemplary distributed system implemented via a general computer environment that may employ the techniques described herein.

FIG. 12 illustrates an exemplary distributed system implemented via a general computer environment 1200 that may employ the techniques described herein. The computer environment 1200 is only one example of a computing environment and is not intended to suggest any limitation as to the scope of use or functionality of the computer and network architectures. Neither should the computer environment 1200 be interpreted as having any dependency or requirement relating to any one or combination of components illustrated in the exemplary computer environment 1200.

Computer environment 1200 includes a general-purpose computing device in the form of a computer 1202. Computer 1202 can be, for example, a computing device 102 of FIG. 1, or implement development system 202 or be a controller 206 of FIG. 2, or be a target device 212 of FIG. 2, or be a controller 620 or target 622 of FIG. 6. The components of computer 1202 can include, but are not limited to, one or more processors or processing units 1204, a system memory 1206, and a system bus 1208 that couples various system components including the processor 1204 to the system memory 1206.

The system bus 1208 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1202 typically includes a variety of computer readable media. Such media can be any available media that is accessible by computer 1202 and includes both volatile and non-volatile media, removable and non-removable media.

The system memory 1206 includes computer readable media in the form of volatile memory, such as random access memory (RAM) 1210, and/or non-volatile memory, such as read only memory (ROM) 1212. A basic input/output system (BIOS) 1214, containing the basic routines that help to transfer information between elements within computer 1202, such as during start-up, is stored in ROM 1212. RAM 1210 typically contains data and/or program modules that are immediately accessible to and/or presently operated on by the processing unit 1204.

Computer 1202 may also include other removable/non-removable, volatile/non-volatile computer storage media. By way of example, FIG. 12 illustrates a hard disk drive 1216 for reading from and writing to a non-removable, non-volatile magnetic media (not shown), a magnetic disk drive 1218 for reading from and writing to a removable, non-volatile magnetic disk 1220 (e.g., a "floppy disk"), and an optical disk drive 1222 for reading from and/or writing to a removable, non-volatile optical disk 1224 such as a CD-ROM, DVD-ROM, or other optical media. The hard disk drive 1216, magnetic disk drive 1218, and optical disk drive 1222 are each connected to the system bus 1208 by one or more data media interfaces 1226. Alternatively, the hard disk drive 1216, magnetic disk drive 1218, and optical disk drive 1222 can be connected to the system bus 1208 by one or more interfaces (not shown).

The disk drives and their associated computer-readable media provide non-volatile storage of computer readable instructions, data structures, program modules, and other data for computer 1202. Although the example illustrates a hard disk 1216, a removable magnetic disk 1220, and a removable optical disk 1224, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1216, magnetic disk 1220, optical disk 1224, ROM 1212, and/or RAM 1210, including by way of example, an operating system 1226, one or more application programs 1228, other program modules 1230, and program data 1232. Each of such operating system 1226, one or more application programs 1228, other program modules 1230, and program data 1232 (or some combination thereof) may implement all or part of the resident components that support the distributed file system.

A user can enter commands and information into computer 1202 via input devices such as a keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to the processing unit 1204 via input/output interfaces 1240 that are coupled to the system bus 1208, but may be connected by other interface and bus structures, such as a parallel port, game port, or a universal serial bus (USB).

A monitor 1242 or other type of display device can also be connected to the system bus 1208 via an interface, such as a video adapter 1244. In addition to the monitor 1242, other output peripheral devices can include components such as speakers (not shown) and a printer 1246 which can be connected to computer 1202 via the input/output interfaces 1240.

Computer 1202 can operate in a networked environment using logical connections to one or more remote computers, such as a remote computing device 1248. By way of example, the remote computing device 1248 can be a personal computer, portable computer, a server, a router, a network computer, a peer device or other common network node, and the like. The remote computing device 1248 is illustrated as a portable computer that can include many or all of the elements and features described herein relative to computer 1202.

Logical connections between computer 1202 and the remote computer 1248 are depicted as a local area network (LAN) 1250 and a general wide area network (WAN) 1252.

Such networking environments are commonplace in offices, enterprise-wide computer networks, intranets, and the Internet.

When implemented in a LAN networking environment, the computer 1202 is connected to a local network 1250 via a network interface or adapter 1254. When implemented in a WAN networking environment, the computer 1202 typically includes a modem 1256 or other means for establishing communications over the wide network 1252. The modem 1256, which can be internal or external to computer 1202, can be connected to the system bus 1208 via the input/output interfaces 1240 or other appropriate mechanisms. It is to be appreciated that the illustrated network connections are exemplary and that other means of establishing communication link(s) between the computers 1202 and 1248 can be employed.

In a networked environment, such as that illustrated with computing environment 1200, program modules depicted relative to the computer 1202, or portions thereof, may be stored in a remote memory storage device. By way of example, remote application programs 1258 reside on a memory device of remote computer 1248. For purposes of illustration, application programs and other executable program components such as the operating system are illustrated herein as discrete blocks, although it is recognized that such programs and components reside at various times in different storage components of the computing device 1202, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although the invention has been described in language specific to structural features and/or methodological acts, it is to be understood that the invention defined in the exemplary appended claims is not limited to the specific features or acts described. Rather, the specific features and acts are disclosed as exemplary forms of implementing the claimed invention. Moreover, these claims are exemplary in terms of scope and subject matter. Many other combinations and sub-combinations of the features described herein may later be claimed in patent applications claiming priority to this application.

What is claimed is:

1. A method comprising:
   receiving an input, associated with a change request, which describes a revision to at least one of a plurality of instances in a model of an actual physical distributed system that comprises an application layer and a host layer, wherein:
      an instance, of the plurality of instances, comprises an instantiation of a type that comprises property values and relationships in the model of the distributed system and comprises an associated version history that links each version of an instance to a change request;
      an instance, of the plurality of instances, comprises associated code that allows a state of an instance to affect a configuration of the model of the distributed system;
      the plurality of instances form an instance space which describes a configuration of the model of the distributed system wherein the plurality of instances comprise one or more hosting relationships that allow for identification of one or more bindings between the application layer and the host layer; and
      the revision pertains to a change to the at least one of said plurality of instances; and
   synchronizing the model with the distributed system such that the revision, when applied to the model, is propagated to the distributed system to thereby change the distributed system.

2. A method as described in claim 1, wherein the distributed system includes one or more applications being executed by a plurality of computing devices.

3. A method as described in claim 1, wherein one or more said instances are described as a series of revisions in the model.

4. A method as described in claim 1, wherein the revision describes a state transition of the at least one of said plurality of instances.

5. A method as described in claim 1, wherein the revision is defined with respect to a previous revision of the at least one of said plurality of instances.

6. A method as described in claim 1, wherein during the synchronizing, the revision is placed in an in progress state that locks the at least one of said plurality of instances from modification by another revision.

7. A method as described in claim 1, wherein:
   the revision is included as a part of a change that includes a plurality of revisions to the model; and
   the synchronizing fails for each said revision when the synchronizing of any one said revisions fails.

8. A method as described in claim 1, wherein:
the revision is in a planned state before the synchronizing is performed;
the revision is in a current state after the synchronizing is performed; and
another revision which is previous to the revision is in a current state before the synchronizing is performed is in a history state after the synchronizing is performed.

9. A method as described in claim 1, wherein:
the revision is defined with respect to a previous revision of the at least one said instance;
the previous revision is set in a current state and the revision is set in a planned state before the synchronizing;
during the synchronizing, the revision is placed in an in progress state that locks the at least one said instance from modification by another revision; and
after the synchronizing, the previous revision is set in a history state and the revision is set in a current state.

10. A method comprising:
applying a change to a model of an actual, physical distributed system that comprises an application layer and a host layer, wherein:
the change describes a plurality of revisions to a plurality of instances in the model of the distributed system;
an instance, of the plurality of instances, comprises an instantiation of a type that comprises property values and relationships in the model of the distributed system and comprises an associated version history that links each version of an instance to a change request;
an instance, of the plurality of instances, comprises associated code that allows a state of an instance to affect a configuration of the model of the distributed system;
the plurality of instances form an instance space which describes a configuration of the model of the distributed system wherein the plurality of instances comprise one or more hosting relationships that allow for identification of one or more bindings between the application layer and the host layer; and
each revision of said plurality of revisions pertains to a change of a respective said instance; and
executing code of the model to apply the change to the distributed system.

11. A method as described in claim 10, wherein the change is successfully applied to the model when each revision of said plurality of revisions is successfully applied to the respective said instance of said plurality of instances.

12. A method as described in claim 10, wherein at least one said instance is described through a series of revisions having a historical state, a current state and a planned state, respectively.

13. A method as described in claim 10, wherein at least one of the plurality of revisions is defined in relation to a previous revision of a said instance of said plurality of instances.

14. A method as described in claim 10, wherein when the applying of the change fails, each of the plurality of instances are reverted to a respective previous revision.

15. One or more computer readable storage media comprising computer executable instructions that, when executed, direct a computer to maintain a model of hardware and software resources of an actual, physical distributed system that comprises an application layer and a host layer, wherein:
the model is defined through use of a plurality of instances wherein an instance, of the plurality of instances, comprises an instantiation of a type that comprises property values and relationships in the model of the distributed system and comprises an associated version history that links each version of an instance to a change request wherein the plurality of instances comprise one or more hosting relationships that allow for identification of one or more bindings between the application layer and the host layer, one or more of the plurality of instances are described through a series of revisions which describe a historical, current and planned state of a respective said instance and an instance, of the plurality of instances, comprises associated code that allows a state of an instance to affect a configuration of the model of the distributed system; and
the state of the revisions in the model affects configuration of the distributed system.

16. One or more computer readable storage media as described in claim 15, wherein each said instance describes property values and identifies members and relationships in which the instance participates.

17. One or more computer readable storage media as described in claim 15, wherein:
the current revision is defined with respect to the historical revision; and
the planned revision is defined with respect to the current revision.

18. One or more computer readable storage media as described in claim 15, wherein the computer executable instructions maintain the model by propagating state changes of the revisions to the distributed system such that configuration changes made to the model are synchronized with the distributed system.

19. One or more computer readable storage media as described in claim 15, wherein the computer executable instructions maintain the model by discovering configuration changes made to the distributed system and applying the discovered changes to the model.

20. One or more computer readable storage media as described in claim 15, wherein each said revision describes a change in property values, members of a respective said instance and a relationship, in which, the respective said instance participates.

* * * * *